(12) United States Patent
Satoh

(10) Patent No.: US 10,056,060 B2
(45) Date of Patent: Aug. 21, 2018

(54) DISPLAY APPARATUS AND DISPLAY METHOD

(71) Applicant: Japan Display Inc., Tokyo (JP)

(72) Inventor: Atsushi Satoh, Tokyo (JP)

(73) Assignee: Japan Display Inc., Tokyo (JP)

( * ) Notice: Subject to any disclaimer, the term of this patent is extended or adjusted under 35 U.S.C. 154(b) by 17 days.

(21) Appl. No.: 15/357,858

(22) Filed: Nov. 21, 2016

(65) Prior Publication Data

US 2017/0169801 A1 Jun. 15, 2017

(30) Foreign Application Priority Data

Dec. 9, 2015 (JP) .................................. 2015-239989

(51) Int. Cl.
*G09G 5/393* (2006.01)
*G06T 1/60* (2006.01)
*G09G 5/395* (2006.01)

(52) U.S. Cl.
CPC .............. *G09G 5/393* (2013.01); *G06T 1/60* (2013.01); *G09G 5/395* (2013.01); *G09G 2300/0823* (2013.01); *G09G 2360/18* (2013.01)

(58) Field of Classification Search
None
See application file for complete search history.

(56) References Cited

U.S. PATENT DOCUMENTS

| 2005/0105001 | A1* | 5/2005 | Yui | G06F 3/14 |
| | | | | 348/441 |
| 2007/0070212 | A1 | 3/2007 | Haneda | |
| 2009/0309890 | A1* | 12/2009 | Mizuno | G09G 5/363 |
| | | | | 345/547 |
| 2012/0200541 | A1* | 8/2012 | Hung | G09G 3/3614 |
| | | | | 345/204 |
| 2016/0275916 | A1* | 9/2016 | Glen | G09G 5/395 |

FOREIGN PATENT DOCUMENTS

| JP | 2005-039711 A | 2/2005 |
| JP | 2005-124167 A | 5/2005 |
| JP | 2007-096915 A | 4/2007 |
| JP | 2007-298801 A | 11/2007 |

* cited by examiner

*Primary Examiner* — James A Thompson
(74) *Attorney, Agent, or Firm* — Michael Best & Friedrich LLP

(57) ABSTRACT

A display apparatus includes a conversion unit, and an output unit. The conversion unit receives an input signal in which frame rates are respectively set for frames, individually sets received frames of the input signal as a first frame to be output with a first polarity or a second frame to be output with a second polarity opposite to the first polarity, and converts the frame rates of the first frames and the frame rates of the second frames so that the first frame period taken to output the first frames and the second frame period taken to output the second frames are equal within a predetermined time period. The output unit outputs the first frames with the first polarity to a display unit, and outputs the second frames with the second polarity to the display unit.

7 Claims, 16 Drawing Sheets

US 10,056,060 B2

DISPLAY APPARATUS AND DISPLAY METHOD

CROSS-REFERENCE TO RELATED APPLICATION

This application is based upon and claims the benefit of priority of the prior Japanese Patent Application No. 2015-239989, filed on Dec. 9, 2015, the entire contents of which are incorporated herein by reference.

FIELD

The embodiments discussed herein relate to a display apparatus and a display method.

BACKGROUND

Conventionally, in many cases, a display apparatus receives a video signal, such as a moving picture signal, at a fixed frame rate and displays the video signal at a fixed refresh rate on a display unit. In recent years, however, a display apparatus has tended to receive a video signal whose frame rate dynamically varies from frame to frame according to the performance of a host device.

SUMMARY

According to one aspect, there is provided a display apparatus including: a conversion unit configured to receive an input signal in which frame rates are respectively set for frames, individually set received frames of the input signal as a first frame to be output with a first polarity or a second frame to be output with a second polarity opposite to the first polarity, and convert the frame rates of the first frames and the frame rates of the second frames so that a first frame period taken to output the first frames and a second frame period taken to output the second frames are equal within a predetermined time period; and an output unit configured to output the first frames with the first polarity to a display unit, and output the second frames with the second polarity to the display unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

If a fixed refresh rate is used for a video signal with a varying input frame rate, there is a concern about a degradation of image quality due to a difference between the input frame rate and the refresh rate. To reduce the degradation of image quality, there is a display apparatus that sets the refresh rate to be an integral multiple of the frame rate of a received moving picture signal. In addition, there is a frame rate conversion apparatus that predicts frames where data output catches up with data input due to a difference between an input frame rate and a refresh rate, in order to reduce blur in displayed images caused by the catch-up.

Please see, for example, Japanese Laid-open Patent Publication Nos. 2007-298801 and 2005-124167.

However, in the case of displaying a video signal with a varying input frame rate, just setting a refresh frame in keeping with the input frame rate may degrade the image quality due to differences between the frame rates of frames.

Hereinafter, several embodiments will be described below with reference to the accompanying drawings.

The disclosure herein is merely an example, and any modification coming within the spirit of the present invention and obvious to those skilled in the art is intended to be included within the scope of the invention as a matter of course. The accompanying drawings schematically illustrate widths, thicknesses, shapes, or other characteristics of each part for clarity of illustration, compared to actual configurations. However, such a schematic illustration is merely an example and not intended to limit the present invention.

In the present specification and drawings, some elements identical or similar to those described previously are denoted by the same reference signs as the previously described elements, and thus repetitive detailed descriptions of them may be omitted as appropriate.

First Embodiment

Figure 1:
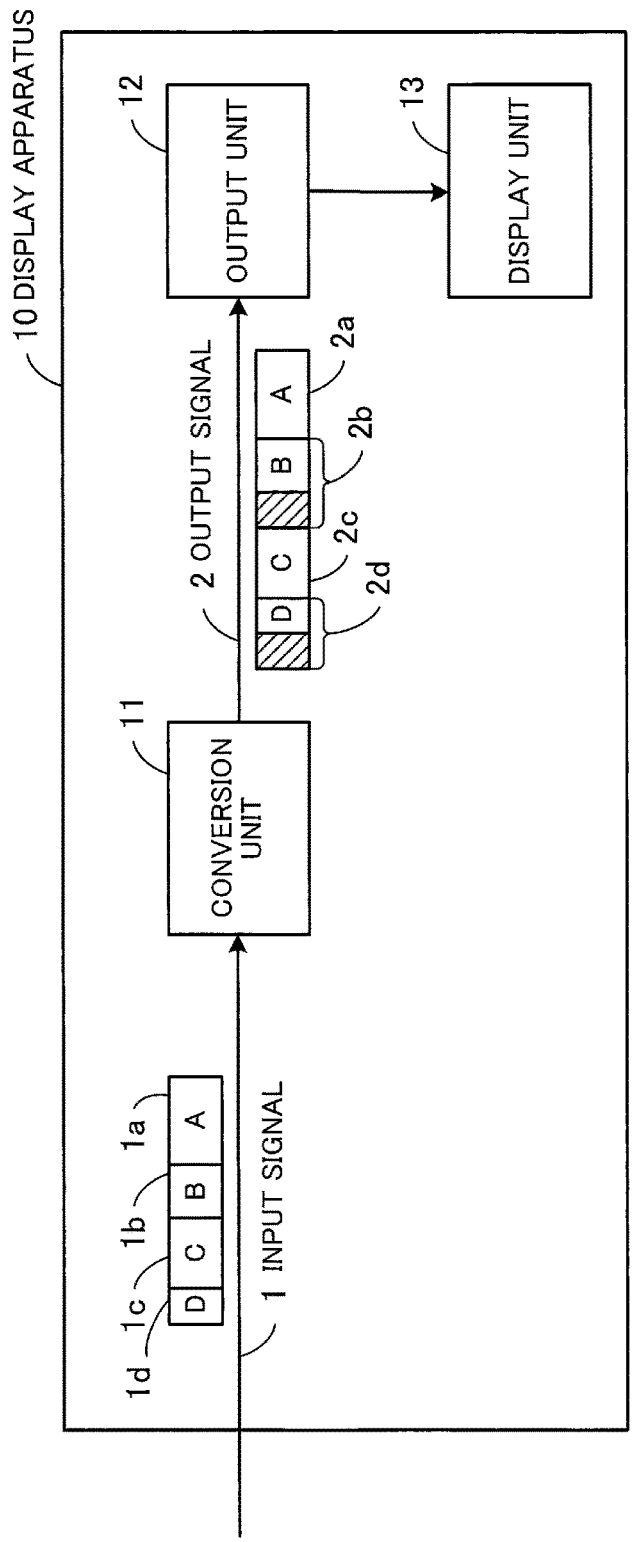
FIG. 1 illustrates a display apparatus according to a first embodiment.

FIG. 1 illustrates a display apparatus according to a first embodiment. A display apparatus 10 of the first embodiment includes a conversion unit 11, an output unit 12, and a display unit 13, and is designed to display images on the basis of an input signal 1 on the display unit 13.

The display apparatus 10 receives an input signal whose frame rate varies from frame to frame. Referring to the example of FIG. 1, the input signal 1 including a frame A (1a), a frame B (1b), a frame C (1c), and a frame D (1d) with different frame rates is input to the display apparatus 10 in this order. The frame rate refers to the number of frames processed per unit time, and a frame period taken to input or output a frame is the inverse number of the frame rate. The frame period is also called a frame cycle. In FIG. 1, the horizontal length of each frame of the input signal 1 represents a frame period. For example, the frame A (1a) has a longer frame period than the frame B (1b) (that is, the frame A (1a) has a lower frame rate). The frame rate is appropriately set according to the load state of a processor that performs signal processing in an external apparatus or own apparatus that generates the input signal 1. The values of the frame rate are appended to the input signal 1 that is then input to the display apparatus 10.

The conversion unit 11 receives the sequentially arriving frames of the input signal 1, and individually sets the received frames as a first frame to be output with a first polarity or a second frame to be output with a second polarity. Then, the conversion unit 11 converts the frame rates of the first frames and the frame rates of the second frames so that a first frame period taken to output the first frames and a second frame period taken to output the second frames are equal within a predetermined time period. In the following, converted frame rates are referred to as output frame rates. The conversion unit 11 generates an output signal 2 with the varying output frame rate, and outputs the output signal 2 to the output unit 12 at the varying output frame rate.

The first frames and the second frames are determined based on an inversion cycle at which the first polarity and the second polarity are inverted. For example, in the case of employing a one-frame inversion cycle at which the polarity is inverted every frame, the frames are sequentially set as a first frame or a second frame alternately every frame. In this connection, the polarity of the first frame is opposite to that of the second frame. In the case of employing a two-frame inversion cycle at which the polarity is inverted every two frames, the frames are sequentially set as first frames and second frames alternately every two frames. FIG. 1 illustrates an example in which the polarity is inverted every frame, and the frame A (1a) is set as a first frame, the frame B (1b) is set as a second frame, the frame C (1c) is set as a first frame, and the frame D (1D) is set as a second frame. The predetermined time period is set to a value that is an integral multiple of the inversion cycle at which the polarity is inverted. For example, in the case of the inversion cycle at which the polarity is inverted every frame, as illustrated in FIG. 1, the predetermined time period may be set to a period of two frames, which corresponds to one cycle, or a period of four frames, which corresponds to two cycles. The frame rates of the respective frames are converted so that the total frame period of the first frames and the total frame period of the second frames are equal within the predetermined time period set as above. Referring to the example of FIG. 1, the predetermined time period is set to a period of one cycle, and the frame rates are converted so that the frame periods of the frame A (1a) and the frame B (1b) are equal and the frame periods of the frame C (1c) and the frame D (1d) are equal. More specifically, setting the frame rate of the frame A (1a) as a common frame rate, the frame B (1b) is converted to an output frame B (2b) by appending thereto a blanking period, which is indicated by diagonal lines. Similarly, the frame D (1d) is converted to an output frame D (2d) having the same frame rate as an output frame C (2c) by appending a blanking period thereto. The output signal 2 is output to the output unit 12 at the varying output frame rate, whose values are set for the respective frames.

The output unit 12 receives the output signal 2, outputs the first frames with the first polarity to the display unit 13, and outputs the second frames with the second polarity opposite to the first polarity, to the display unit 13.

The first and second frames are output alternately, and thereby the display unit 13 is driven in the inversion driving method.

For example, in the case where the display unit 13 is a liquid crystal device, the polarity of a display signal to be supplied to pixel electrodes with the potential of a common electrode as a reference is inverted at a predetermined cycle, in order to reduce the degradation of liquid crystal materials caused by continuously applying a direct current voltage of the same polarity to the liquid crystal. However, if the liquid crystal device is operated using the frame rate of the input signal 1 as it is, which is set for each frame, an imbalance occurs between the positive and negative polarities, a direct current component is superposed to the liquid crystal device, and as a result the image quality may degrade. In the display apparatus 10, the conversion unit 11 converts the frame rate of the input signal 1 so that the output frame period of first frames and the output frame period of second frames are equal, to thereby generate the output signal 2. The output unit 12 receives the output signal 2, outputs the first frames with the first polarity to the display unit 13 and the second frames with the second polarity to the display unit 13. Thereby, the display unit 13 has the same operating time between an operation with the first polarity and an operation with the second polarity opposite to the first polarity, which makes it possible to reduce the degradation of image quality.

In this connection, in the above example, the predetermined time period is set to a period based on the one-frame inversion cycle. In the case of the two-frame inversion cycle, the frame D (1d) may be treated as a frame corresponding to the frame A (1a), and the frame C (1C) may be treated as a frame corresponding to the frame B (1b). That is to say, a desired combination of frames is possible if the total frame period of first frames and the total frame period of second frames are equal within a predetermined time period.

Second Embodiment

Figure 2:
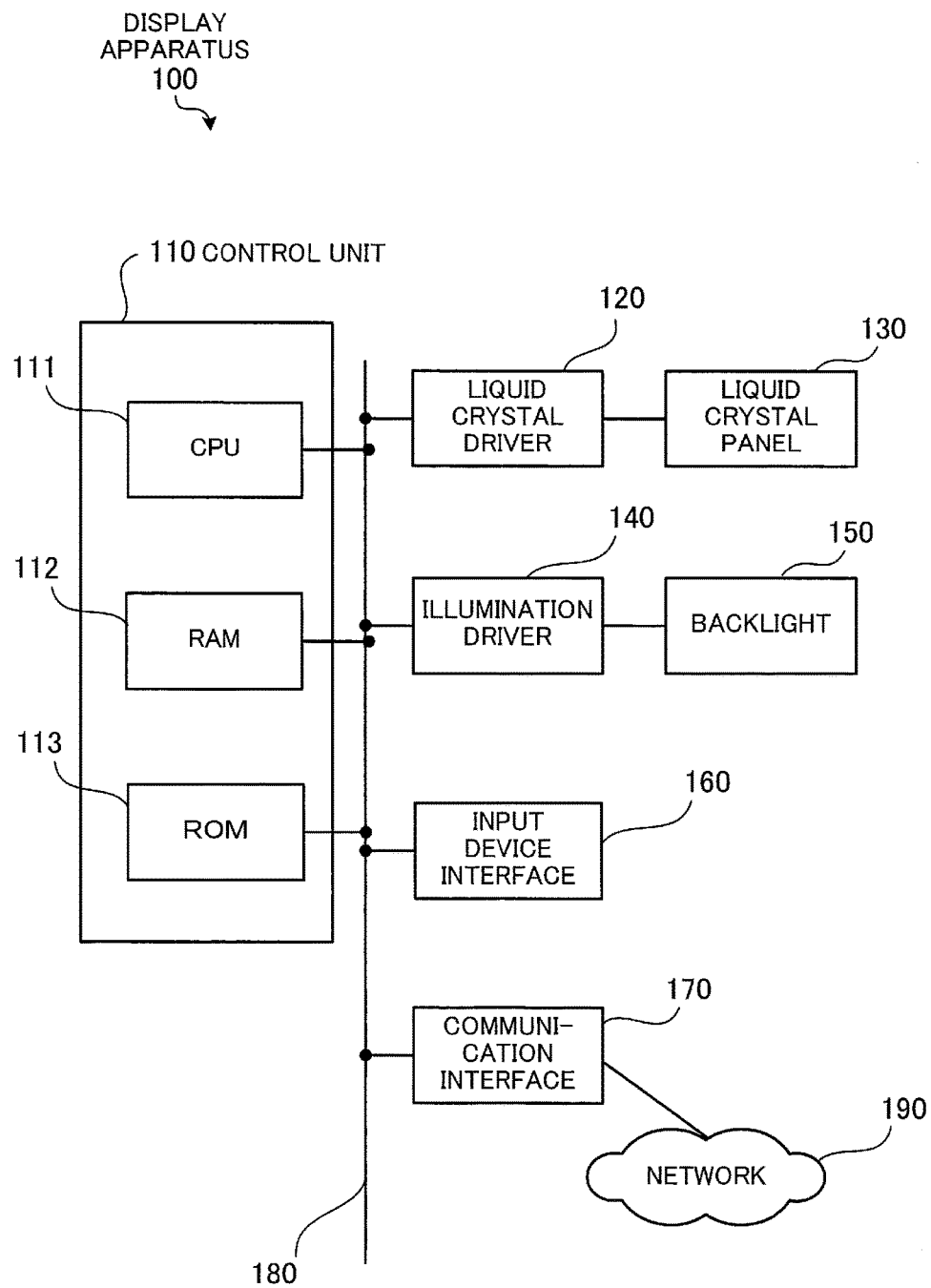
FIG. 2 illustrates an exemplary hardware configuration of a display apparatus according to a second embodiment.

The following describes the hardware configuration of a display apparatus. FIG. 2 illustrates an exemplary hardware configuration of a display apparatus according to a second embodiment.

A display apparatus 100 is entirely controlled by a control unit 110. The control unit 110 includes a Central Processing Unit (CPU) 111. A Random Access Memory (RAM) 112, Read Only Memory (ROM) 113, and a plurality of peripherals are connected to the CPU 111 with a bus 180.

The CPU 111 is a processor that implements the processing functions of the control unit 110.

The RAM 112 is used as a primary storage device of the control unit 110, and temporarily stores at least part of Operating System (OS) programs and application programs that are to be executed by the CPU 111. The RAM 112 also stores various data that is to be used by the CPU 111 in processing.

The ROM 113 is a read-only semiconductor storage device for storing the OS programs, application programs, and fixed data, which is not rewritten. A flash memory or another semiconductor memory device may be used as a secondary storage device, in place of or in addition to the ROM 113.

The peripherals connected to the bus 180 include a liquid crystal driver 120, an illumination driver 140, an input device interface 160, and a communication interface 170.

A liquid crystal panel 130 is coupled to the liquid crystal driver 120. In the liquid crystal panel 130, pixels are arranged in a matrix. By sequentially driving a common electrode and a pixel electrode corresponding to each pixel, an image is displayed. An electric field that drives the liquid crystal panel 130 may be a horizontal electric field or a vertical electric field. The liquid crystal driver 120 performs inversion driving to invert the polarity of the pixel electrodes at a predetermined cycle with the potential of the common electrode as a reference. As the inversion driving method, frame inversion for inverting the polarity every frame, line inversion for inverting the polarity every line (pixel line), column inversion for inverting the polarity every column (pixel column), dot inversion for inverting the polarity every dot, or another may be employed. Any one of these inversion driving methods may be employed for a liquid crystal panel. In addition, a transparent liquid crystal panel, a reflective liquid crystal panel, or a semi-transparent liquid crystal panel may be used as the liquid crystal panel 130. The following describes the case where the liquid crystal panel 130 is driven in a driving method employing the one-frame inversion cycle at which the polarity is inverted every frame.

A backlight 150 is coupled to the illumination driver 140. The backlight 150 is an example of an illumination unit. The illumination driver 140 controls the light source of the backlight 150 to control the luminance of the backlight 150. For example, a Light Emitting Diode (LED) may be used as the light source. In this connection, although the backlight 150 that is disposed on the back of the liquid crystal panel 130 is exemplified as an example of the illumination unit, the position of the illumination unit is not limited thereto. In the case where the liquid crystal panel is a reflective liquid crystal panel, for example, a front light that is disposed on the front of the liquid crystal panel may be used as the illumination unit. In addition, in the case where the liquid crystal panel is a reflective liquid crystal panel, the backlight 150 and illumination driver 140 may not be used.

An input device for entering instructions from users may be connected to the input device interface 160. For example, a keyboard, a pointing device, such as a mouse or a touch panel, or another input device may be connected. The input device interface 160 gives signals received from an input device to the CPU 111. The communication interface 170 is connected to a network 190. The communication interface 170 communicates data with another computer or communication device over the network 190.

Figure 3:
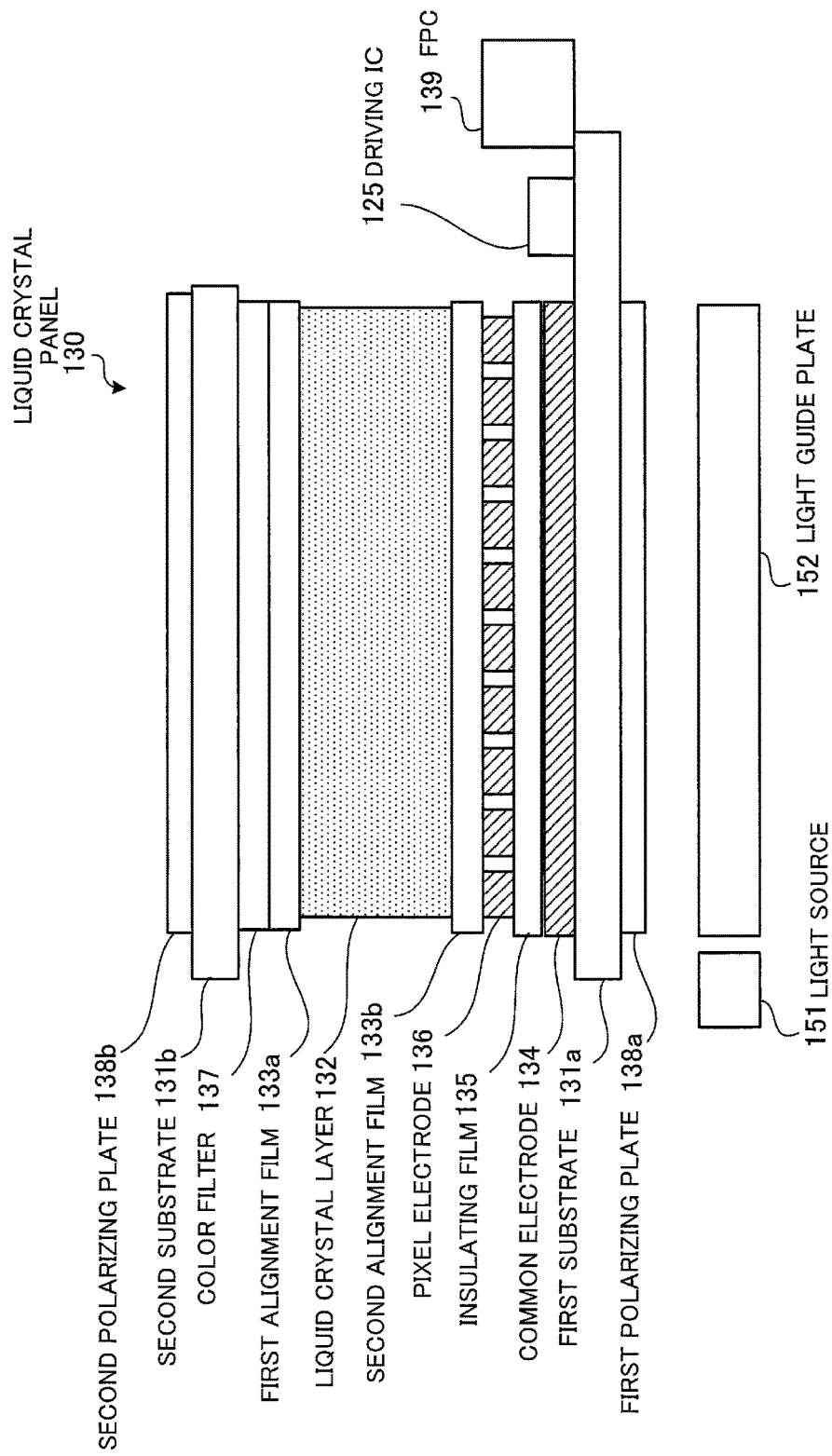
FIG. 3 is a cross-sectional view illustrating an exemplary configuration of a liquid crystal panel.

The following describes a liquid crystal panel. FIG. 3 is a cross-sectional view illustrating an exemplary configuration of the liquid crystal panel.

The liquid crystal panel 130 includes, between a first substrate 131a and a second substrate 131b, a liquid crystal layer 132, a first alignment film 133a and a second alignment film 133b disposed with the liquid crystal layer 132 therebetween, a common electrode 134, insulating film 135, and pixel electrodes 136 disposed on the first substrate 131a, and a color filter 137 disposed on the second substrate 131b. In addition, a first polarizing plate 138a is disposed on the outer side of the first substrate 131a, and a second polarizing plate 138b is disposed on the outer side of the second substrate 131b. Furthermore, a backlight having a light source 151 and a light guide plate 152 is disposed under the liquid crystal panel 130. Light emitted from the light source 151 is scattered by the light guide plate 152, and is then incident to the liquid crystal panel 130.

The first substrate 131a is an array substrate on which the common electrode 134, insulating film 135, pixel electrodes 136, and the second alignment film 133b are laminated in order toward the liquid crystal layer 132 side. An electric field generated by a potential difference between the common electrode 134 and the pixel electrodes 136, which have the insulating film 135 therebetween, rotates liquid crystal molecules of the liquid crystal layer 132 and thereby changes the polarization direction of light passing through the liquid crystal panel 130. By changing the transmissivity of light passing through each pixel using the polarization direction of the liquid crystal molecules, the first polarizing plate 138a, and the second polarizing plate 138b, images are displayed. The second alignment film 133b collaborates with the first alignment film 133a to align the directions of the liquid crystal molecules when no potential difference is caused between the common electrode 134 and the pixel electrodes 136. The second substrate 131b is a counter substrate, on which the color filter 137 and the first alignment film 133a are laminated toward the liquid crystal layer 132 side. The color filter 137 converts light coming after passing through the liquid crystal layer 132 into a prescribed color and emits the resulting light.

In addition, on the first substrate 131a, a driving IC 125 for driving pixel circuits and a Flexible Printed Circuit (FPC) 139 for connecting an external signal line and the driving IC 125 are mounted.

In this connection, FIG. 3 illustrates the configuration where the common electrode 134 and the pixel electrodes 136 are disposed on the first substrate 131a. However, the positions of the common electrode 134 and the pixel electrodes 136 are not limited thereto. At least either one of the common electrode 134 and the pixel electrodes 136 may be disposed on the second substrate 131b. In addition, the pixel electrodes 136, insulating film 135, common electrode 134, and second alignment film 133b may be laminated in this order on the first substrate 131a. The pixel electrodes 136 and the common electrode 134 may be disposed on the same layer with an insulating film therebetween. Further, the color filter 137 may be disposed on the first substrate 131a. Still further, the driving IC 125 may be mounted on the FPC 139.

Figure 4:
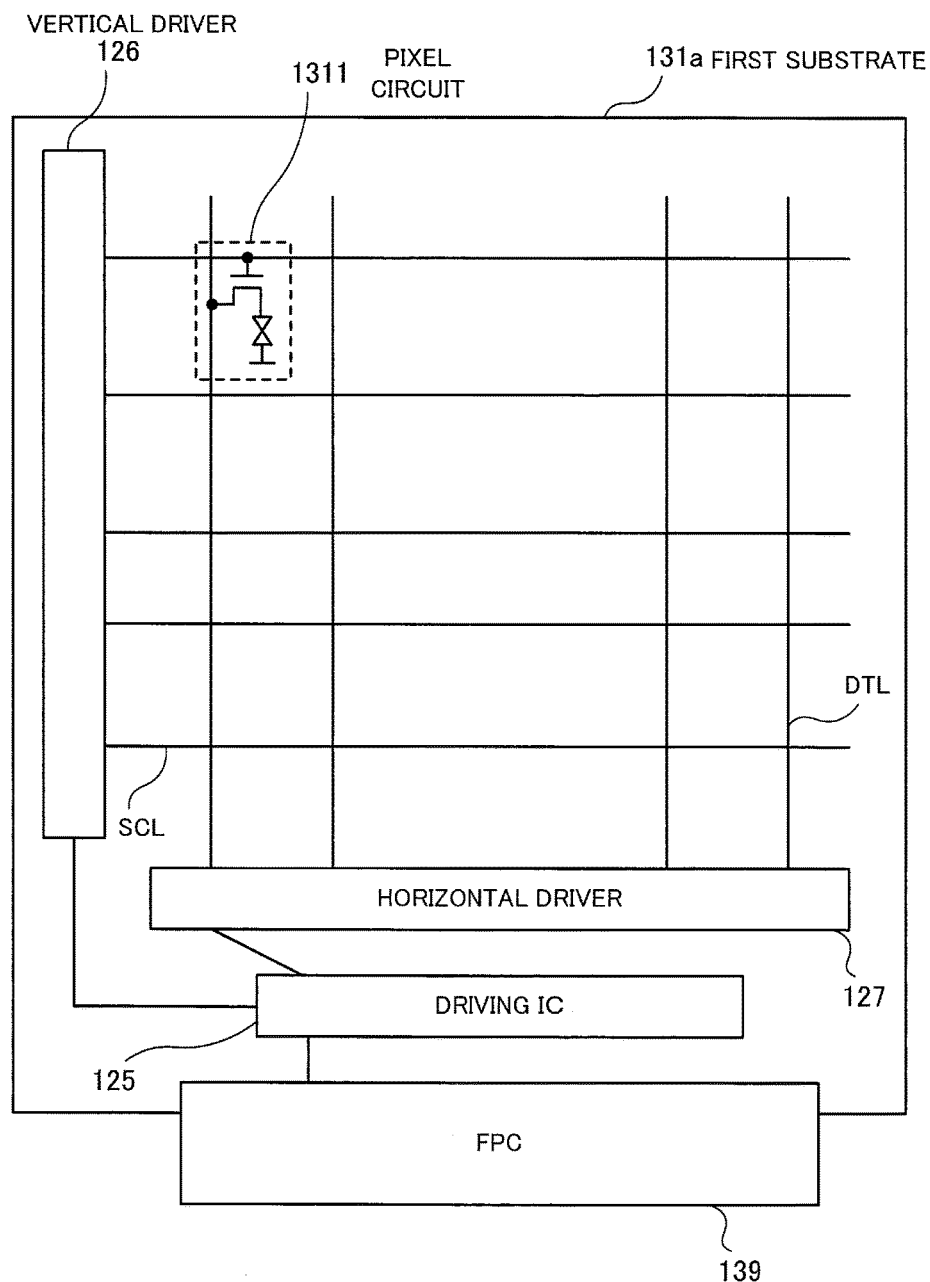
FIG. 4 illustrates an exemplary configuration of a pixel unit of the liquid crystal panel.

The following describes the configuration of a pixel unit. FIG. 4 illustrates an exemplary configuration of a pixel unit of the liquid crystal panel. FIG. 4 illustrates an active matrix configuration.

In a display area of the first substrate 131a, a plurality of scan lines SCL and a plurality of signal lines DTL are disposed vertically and horizontally, and a pixel circuit 1311 is disposed at each intersection of these lines. For example, the pixel circuit 1311 is made up of a Thin Film Transistor (TFT), which is a switching element, and a liquid crystal and electrode connected to the TFT. In the peripheral area, a vertical driver 126 for scan-driving the scan lines SCL and a horizontal driver 127 for supplying a video signal to the signal lines DTL are disposed, and these vertical driver 126 and horizontal driver 127 are connected to the driving IC 125. In the example of FIG. 4, the driving IC 125, vertical driver 126, and horizontal driver 127 collaborate with each other to drive the pixel circuit 1311. In this way, the liquid crystal driver 120 may be configured such that the driving IC 125, vertical driver 126, and horizontal driver 127 share processing.

Driven by the vertical driver 126, the pixel circuit 1311 supplies a video signal written therein through the signal line DTL via the TFT, to the pixel electrode 136. A common potential is applied to the common electrode 134. Thereby an electric field is generated by the potential difference between the pixel electrode 136 and the common electrode 134, and thereby liquid crystal molecules are rotated.

The processing functions of the embodiment are implemented with the above hardware configuration. The above-described configuration is an example only, and another configuration is applicable.

Figure 5:
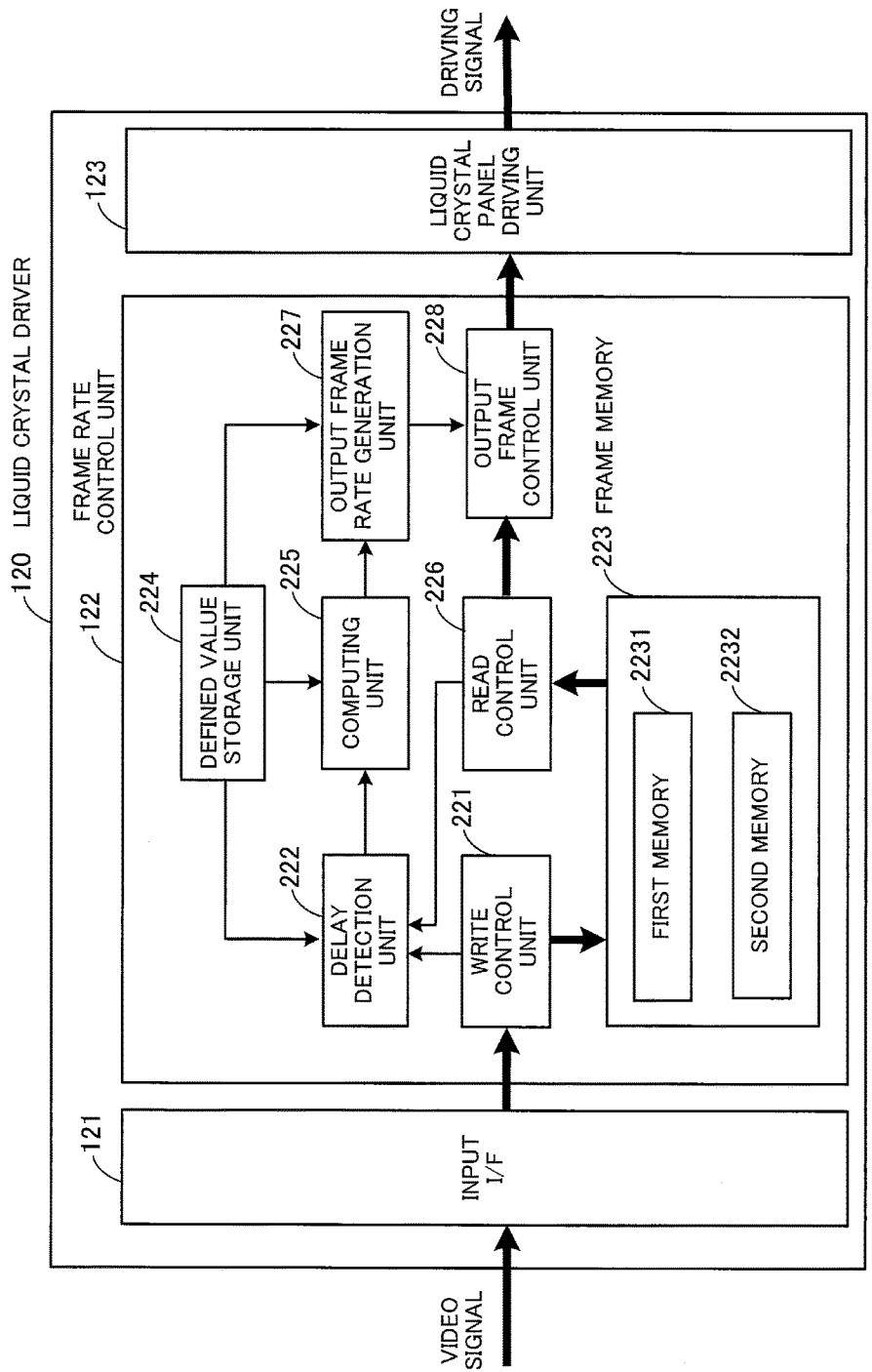
FIG. 5 is a functional block diagram illustrating a configuration of a liquid crystal driver.

The following describes the configuration of a liquid crystal driver 120. FIG. 5 illustrates a functional block configuration of the liquid crystal driver. The liquid crystal driver 120 has an input interface (I/F) 121, a frame rate control unit 122, and a liquid crystal panel driving unit 123. Thick arrows in FIG. 5 represent a flow of a signal whose frame rate is to be controlled. A video signal is written in a frame memory 223 via the input interface 121 and a write control unit 221. The video signal written in the frame memory 223 is output to the liquid crystal panel driving unit 123 via a read control unit 226 and an output frame control unit 228, and then is output from the liquid crystal panel driving unit 123 as a driving signal to drive the liquid crystal panel 130. Each unit will be described.

The input interface 121 receives a video signal generated by a host device, converts the video signal to a signal dedicated for the driver, and then outputs the signal to the frame rate control unit 122. The video signal is generated by the CPU 111 that has performed application processing, for example. Alternatively, the video signal may be input from outside via the communication interface 170.

The liquid crystal panel driving unit 123 receives an output signal from the frame rate control unit 122, converts the received signal into a driving signal for driving the liquid crystal panel 130, and outputs the driving signal to the liquid crystal panel 130. In the display apparatus 100, the liquid crystal panel 130 is driven in the one-frame inversion driving method. Therefore, the liquid crystal panel driving unit 123 inverts the polarity of the driving signal every frame to drive the liquid crystal panel 130. The liquid crystal panel driving unit 123 is an example of the output unit 12 of FIG. 1.

The frame rate control unit 122 converts the frame rate of an input signal received from the input interface 121, and outputs the resulting signal to the liquid crystal panel driving unit 123. Since the signal is processed frame by frame, the signal input to the frame rate control unit 122 is referred to as input frames, and the signal output from the frame rate control unit 122 is referred to as output frames in the following description. The frame rate control unit 122 is one example of the conversion unit 11 of FIG. 1. The frame rate control unit 122 includes the write control unit 221, a delay detection unit 222, the frame memory 223, a defined value storage unit 224, a computing unit 225, the read control unit 226, an output frame rate generation unit 227, and the output frame control unit 228. A processor provided in the liquid crystal driver 120 implements the processing functions of the write control unit 221, delay detection unit 222, computing unit 225, read control unit 226, output frame rate generation unit 227, and output frame control unit 228. The frame memory 223 and the defined value storage unit 224 are implemented by using storage space set aside in a memory provided in the liquid crystal driver 120.

The write control unit 221 controls writing of input frames that are input from the input interface 121 at frame rates that are set for the respective frame, to the frame memory 223. The write control unit 221 notifies the delay detection unit 222 of the writing start and the value of the frame rate set for each input frame. Note that the frame rate may be detected by the delay detection unit 222.

The delay detection unit 222 detects a delay time from the start of writing of the data of a frame to the frame memory 223 to the start of reading of the data of the frame therefrom, and a frame rate used for inputting the frame, and notifies the computing unit 225 of the detected delay time and frame rate. For example, the delay detection unit 222 obtains the start timing of the writing from the write control unit 221 and the start timing of the reading from the read control unit 226, and calculates the delay time. In addition, the delay detection unit 222 may obtain the input frame rate from the write control unit 221. For example, the delay detection unit 222 may measure a time period between the start time of the frame and the start time of the next frame, and calculate the input frame rate on the basis of the measured time period.

The frame memory 223 temporarily stores the frame data of input frames input via the input interface 121, on a frame-by-frame basis. The frame memory 223 has at least two areas each for storing the data part of one frame (for one screen to be displayed). Referring to the example of FIG. 5, a first memory 2231 and a second memory 2232 are provided. Such a frame memory is called a two-plane frame memory. Each time the write control unit 221 receives a frame, the write control unit 221 writes its data part in the first memory 2231 or the second memory 2232 of the two-plane frame memory 223 alternately.

The defined value storage unit 224 stores information needed for the computing unit 225 to calculate an output frame rate. For example, the defined value storage unit 224 stores defined values, such as upper and lower limit values of input frame rates.

The computing unit 225 calculates an output frame rate on the basis of the delay time and input frame rate obtained from the delay detection unit 222 and the defined values stored in the defined value storage unit 224 so that the frame period of a first frame corresponding to the driving signal with a first polarity and the frame period of a second frame corresponding to the driving signal with a second polarity are equal. How to calculate the output frame rate will be described in detail later.

The output frame rate generation unit 227 generates a timing signal regarding an output frame rate, which is needed by the output frame control unit 228, on the basis of the output frame rate calculated by the computing unit 225. The output frame control unit 228 collaborates with the read control unit 226 to control the frame rate of output data to be output, on the basis of the timing signal regarding the output frame rate generated by the output frame rate generation unit 227.

A frame rate control process is performed by the liquid crystal driver 120 configured as above.

In this connection, in the above configuration, the frame rate control is performed by using the processor and memory provided in the liquid crystal driver 120. Alternatively, at least part of the frame rate control may be performed by the control unit 110.

Figure 6:
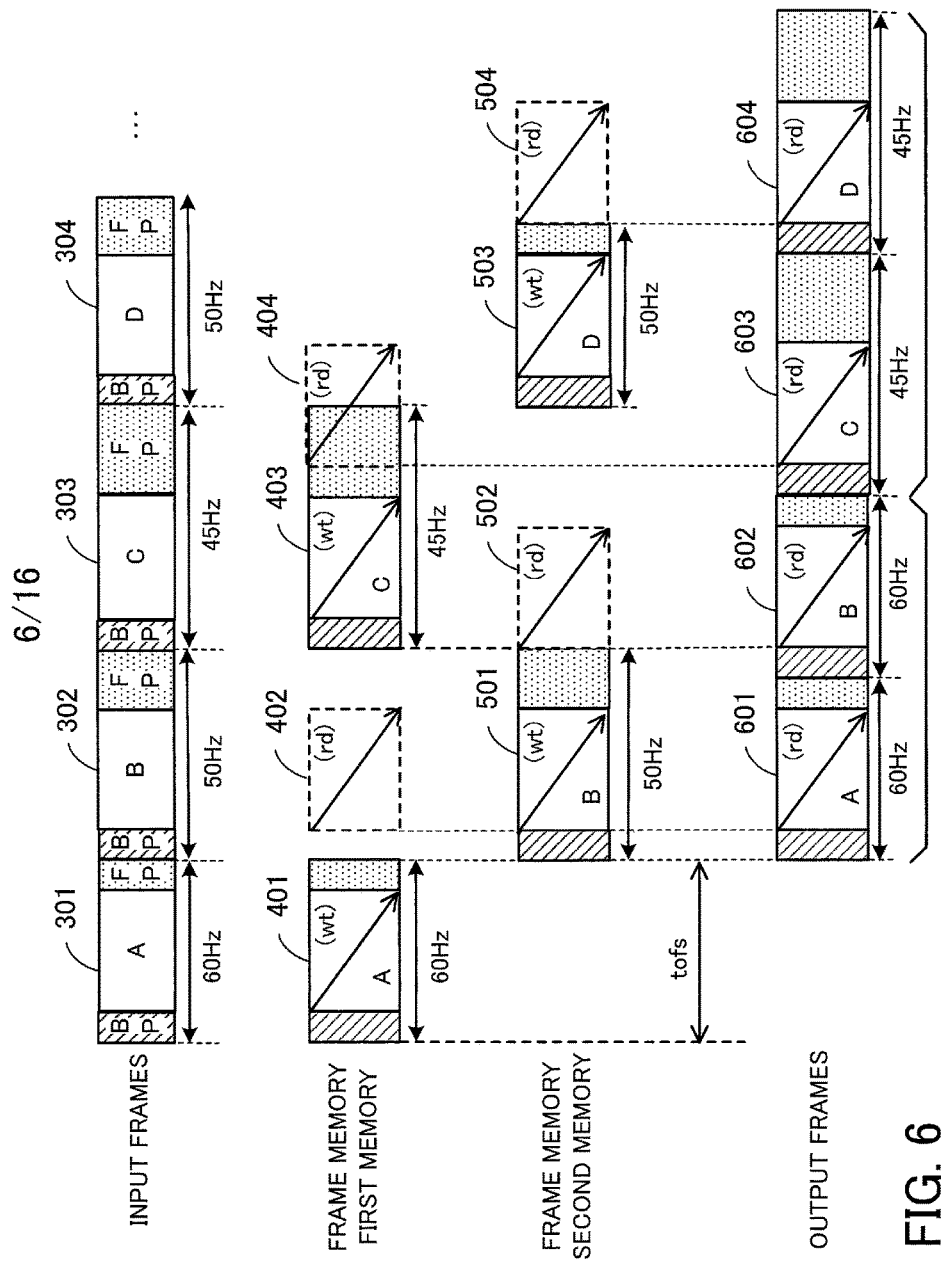
FIG. 6 illustrates an example of frame rate control performed by a frame control unit.

The following describes a frame rate control process performed by the frame rate control unit 122. In the following description, it is assumed that the frame memory 223 has two planes as memory areas, and the frame rate control process is performed in the configuration where the polarity is inverted every frame. FIG. 6 illustrates an example of the frame rate control performed by the frame control unit. In FIG. 6, the horizontal axis represents time elapsed, and operations of input frames on the first and second memories and a series of output frames are represented along the horizontal time axis.

To the frame rate control unit 122, a frame A 301 with a 60 Hz frame rate, a frame B 302 with a 50 Hz frame rate, a frame C 303 with a 45 Hz frame rate, and a frame D 304 with a 50 Hz frame rate are sequentially input as input frames.

The frame A 301 includes a back porch (BP), a data (A) portion, and a front porch (FP). The frame rate is adjusted by using the FP. This applies to the other frames. Therefore, the data amount of the data portion, the timing to start writing or reading the data portion after the frame is input, and the timing to end the writing or reading are fixed, irrespective of the frame rate. This embodiment exemplifies the case of adjusting the frame rate by using the FP. Alternatively, the frame rate may be adjusted by using the BP.

In synchronization with the input frames, the write control unit 221 writes the data of the frames alternately in the first memory 2231 and the second memory 2232 of the frame memory 223. In a first write process 401, the data A of the frame A 301 is written in the first memory 2231, and in the following write process 501, the data B of the frame B 302 is written in the second memory 2232. The oblique arrow indicated in the write process 401 represents an order of writing the data. This applies to the others. In the following, one cycle of using the memory areas provided in the frame memory 223 is referred to as one round. For example, in the case of the frame memory 223 having two planes as memory areas, an end of one round means an end of writing sequentially to the first memory 2231 and then to the second memory 2232 in this order. This applies to the read processes. In the following description, frames to be written in the first memory 2231 are referred to as first frames, and frames to be written in the second memory 2232 are referred to as second frames.

The delay detection unit 222 measures a delay time tofs that is a time period from the start of writing the data A of the frame A 301 that is first frame data in the first memory 2231 until it becomes possible to read the data therefrom, and notifies the computing unit 225 of the delay time tofs. In addition, the delay detection unit 222 also detects the input frame rate of the frame A 301, and then notifies the computing unit 225 of the input frame rate.

On the basis of the input frame rate and the delay time tofs of the input frame, the computing unit 225 calculates an output frame rate for the output frame. In this calculation, the computing unit 225 also refers to the upper and lower limit values of the input frame rates, which are stored in the defined value storage unit 224. In the example of FIG. 6, the computing unit 225 calculates a common output frame rate for two continuously input frames corresponding to one inversion cycle. In this example, out of the continuously input first and second frames, the frame rate of the first frame that is input first is set as the common output frame rate. For example, in the case of the continuously input frame A 301 (60 Hz) and frame B 302 (50 Hz), a 60 Hz output frame rate is set as the common output frame rate. This 60 Hz output frame rate is the same as the input frame rate used for inputting the frame A 301.

The output frame rate generation unit 227 generates a timing signal regarding the set 60 Hz output frame rate, and outputs the generated timing signal to the output frame control unit 228. For example, the output frame rate generation unit 227 counts a clock signal and generates the timing signal regarding the frame rate. The output frame control unit 228 controls an output-frame output process on the basis of the timing signal regarding the 60 Hz output frame rate. The read control unit 226 reads the data A from the first memory 2231 with a read process 402. The output frame control unit 228 outputs an output frame A 601 generated based on the read data to the liquid crystal panel driving unit 123. Similarly, the read control unit 226 reads the data B at the 60 Hz frame rate from the second memory 2232 with a read process 502, and generates an output frame B 602. In this way, the output frame A 601 and the output frame B 602 are output at the same frame rate. Similarly, an output frame C 603 and an output frame D 604 are output at an output frame rate of the same value as the 45 Hz input frame rate of the frame C 303.

In this way, by setting the same frame rate for the first and second frames that are continuously input to the liquid crystal panel driving unit 123 that drives the liquid crystal panel 130 by inverting the polarity at the one-frame inversion cycle, it becomes possible to equalize the time period of driving the liquid crystal panel 130 with the first polarity to the time period of driving the liquid crystal panel 130 with the second polarity. This reduces the degradation of image quality caused when a direct current component is superposed to a liquid crystal device due to an imbalance of the polarities.

By the way, in the case of FIG. 6, a timing inconsistency in which the read timing from the frame memory 223 occurs before the write timing to the frame memory 223 does not occur. For example, if such a timing inconsistency occurs, i.e., if the reading of a frame that is input earlier becomes later than the writing of a frame that is input later or if the reading of a frame occurs before the writing of the frame, frame missing or frame repetition may occur.

Figure 7A:
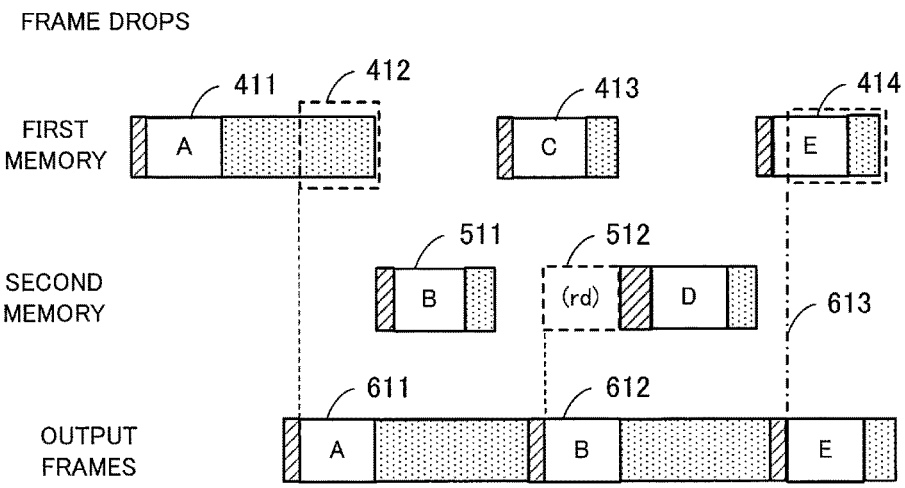
FIGS. 7A and 7B illustrate situations where frame missing and frame repetition occur.
Figure 7B:
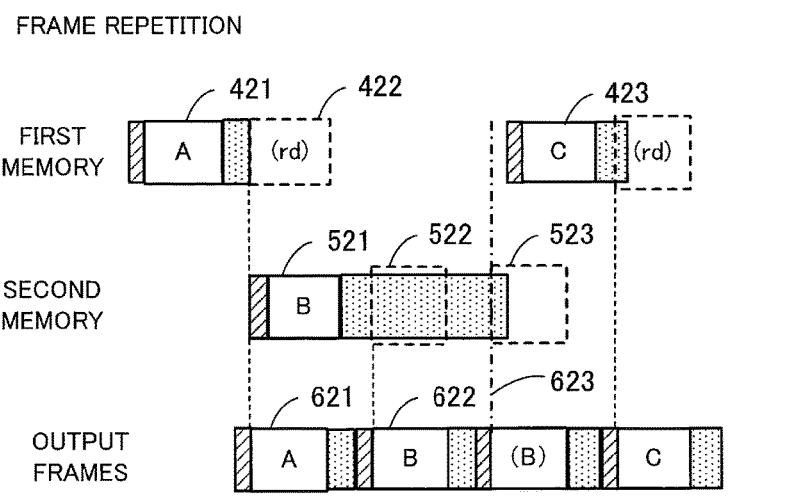

The following describes in what situation frame missing or frame repetition occurs. FIG. 7A illustrates a situation where frame missing occurs, whereas FIG. 7B illustrates a situation where frame repetition occurs. Note that the same conditions as FIG. 6 are applied for the frame rate control process, such as the inversion cycle for the polarity of electrodes and the frame memory 223 having two planes as memory areas.

Referring to FIG. 7A, for example, frame missing occurs in the case where a frame B with a high frame rate follows a frame A with a low frame rate. The timing to perform write processes of input frames to the frame memory 223 is controlled based on their input frame rates. In the example of FIG. 7A, a write process 411 of the data A to the first memory 2231, a write process 511 of the data B to the second memory 2232, and a write process 413 of the data C to the first memory 2231 are performed on the basis of the input frame rates. The computing unit 225 sets the input frame rate of the frame A that is input first, as a common output frame rate for an output frame A 611 and an output frame B 612. After the write process 511 of the data B with a high frame rate is complete, the write process 413 of the data C starts. However, at this time, a process for the output frame B 612 has not started. Then, before the reading of the data C starts, a write process 414 of the data E is performed. That is to say, since the frame rate of the output frame B 612 is low with a long FP so as to adjust the frame rate of the output frame B 612 to be the same as that of the output frame A 611, the write process 414 of the data E to the first memory 2231 starts before the read process of the data C from the first memory 2231 starts, which means that a timing inconsistency occurs. At an output time 613 for the frame C after the output of the output frame B 612 is complete, the data of the frame E exists in the first memory 2231, and therefore the frame C is missing.

On the other hand, as illustrated in FIG. 7B, for example, frame repetition occurs in the case where a frame B with a low frame rate follows a frame A with a high frame rate. As in the case of FIG. 7A, the timing to perform write processes of input frames to the frame memory 223 is controlled based on their input frame rates. In the example of FIG. 7B, a write process 421 of the data A to the first memory 2231, a write process 521 of the data B to the second memory 2232, and a write process 423 of the data C to the first memory 2231 are performed on the basis of the input frame rates. The computing unit 225 sets the input frame rate of the frame A that is input first, as a common output frame rate for an output frame A 621 and an output frame B 622. Therefore, at the output time 623 for the frame C after the output of the output frame B 622 is complete, a write process 423 of the data C has not started yet. In this connection, since a long FP is set for the input of the frame B, the writing of the frame C does not start even after the reading of the frame B is completed. As a result, a timing inconsistency occurs, in which a read process of the frame C starts before the write process 423 of the data C. Since the data of the frame C to be output after the output frame B 622 does not exist, the frame repetition of the frame B occurs.

In this connection, the above happenings may be caused in the case where the input frame rate of at least a frame that is input first out of continuously input frames is used as an output frame rate in the display apparatus 100 that has two planes as memory areas in the frame memory 223 and employs the one-frame inversion cycle. By providing three or more planes as memory areas in the frame memory 223, it becomes possible to increase a time interval between a read process and a write process on the same memory, thereby reducing the occurrence of frame missing or frame repetition. Further, four, six, . . . 2n (n1) planes may be provided as memory areas in the frame memory 223, even-numbered memories may be operated in the same way as the first memory, and odd-numbered memories may be provided in the same way as the second memory. This fixes the location of data to be output at the same output frame rate in a memory, which streamlines processing. In addition, the computing unit 225 is able to control the output frame rate so as to reduce the occurrence of frame missing and frame repetition while using the input frame rate as much as possible.

In the display apparatus 100 that have two planes as memory areas in the frame memory 223 and employs the one-frame inversion cycle, the frame rate control unit 122 controls the output frame rate so as to reduce the occurrence of frame missing and frame repetition when setting a common value as the output frame rate for a first frame and a second frame.

First, the frame rate control unit 122 sets a limit on a range of input frame rates for frames coming from a sender. For example, it is assumed that the frame rates of frames input to the liquid crystal driver 120 satisfy the following expression (1):

$$F\max \leq 2 F\min \quad (1)$$

wherein Fmax denotes the maximum frame rate and Fmin denotes the minimum frame rate.

By limiting the range of frame rates for a video signal to be input, as in the expression (1), it is possible to reduce the occurrence of frame missing and frame repetition that are caused due to a difference between the frame rates of frames, as illustrated in FIGS. 7A and 7B. The frame rate control unit 122 obtains the maximum frame rate Fmax and the minimum frame rate Fmin of the video signal in advance from the sender, and stores them in the defined value storage unit 224 of the frame rate control unit 122.

Second, the frame rate control unit 122 sets a range of delay time from writing to reading of frame data on the frame memory 223. The maximum delay time tofsmax is represented by the following expression (2).

$$tofs\max = 2/F\max \quad (2)$$

By defining the expression (2), the reading from the first memory 2231 always starts between the start of writing to the first memory 2231 and the end of writing to the second memory 2232. In this connection, the minimum delay time tofsmin is set to a certain value between zero and the maximum delay time tofsmax. The maximum delay time tofsmax and the minimum delay time tofsmin are stored in the defined value storage unit 224 of the frame rate control unit 122.

Third, the frame rate control unit 122 measures a delay time tofs from the start of writing to the first memory 2231 to the start of reading therefrom, and calculates a range of output frame rate which enables to avoid the risks of frame missing and frame repetition at the time of completing the writing to the first memory 2231. More specifically, the frame rate control unit 122 calculates the range of output frame rate such that the next delay time certainly falls within a range between the maximum delay time tofsmax and the minimum delay time tofsmin.

Figure 8:
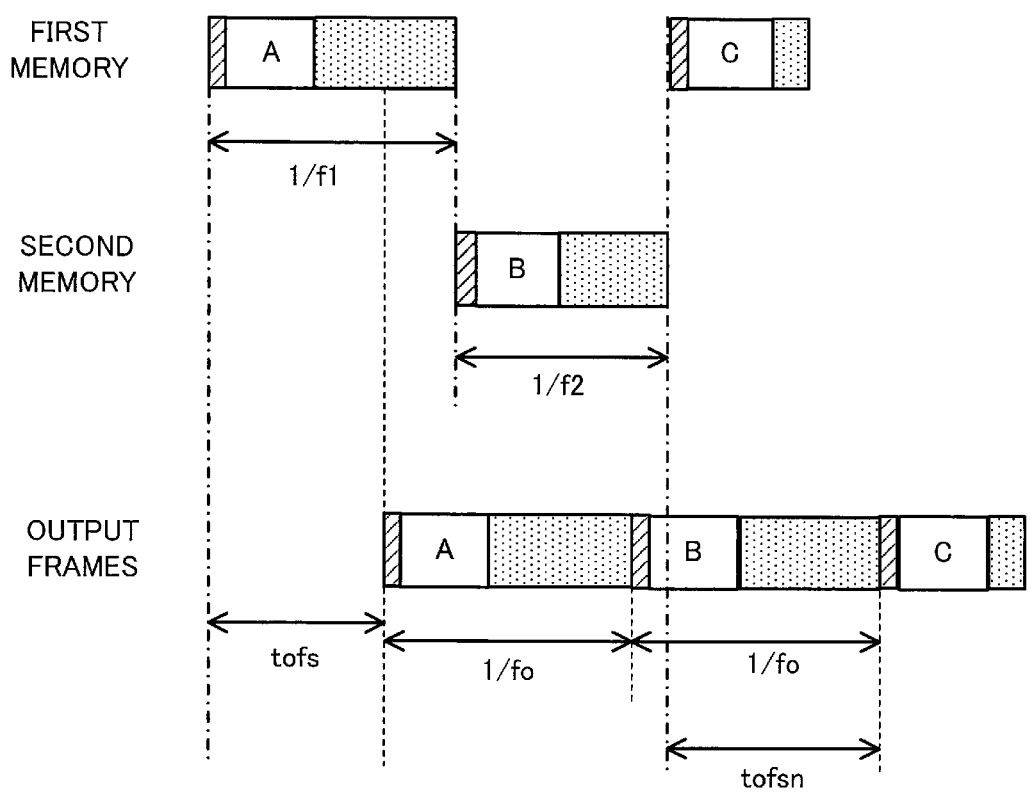
FIG. 8 illustrates a next delay time.

The next delay time will be described. FIG. 8 illustrates a next delay time. In FIG. 8, f1 indicates the input frame rate of a first frame, f2 indicates the input frame rate of a second frame, fo indicates a common output frame rate, tofs indicates a measured delay time of the current frame (frame A) in the first memory 2231, and tofsn indicates a next delay time of a next frame (frame C). Note that the next delay time is an estimated delay time. As illustrated in FIG. 8, assuming that the current first frame is the frame A and the time to start to write the frame A is taken as a starting time point, the time to start writing the frame C, which becomes the first frame next, is after the frame period 1/f1 of the current first frame (frame A) and the frame period 1/f2 of the second frame (frame B) have passed. On the other hand, the time to start reading the frame C is after the delay time tofs of the current first frame (frame A), the output frame period 1/fo of the first frame, and the output frame period 1/fo of the second frame have passed since the same starting time point. Therefore, the next delay time tofsn is represented by the following expression (3).

$$tofsn = -1/f2 + (2/fo - 1/f1 + tofs) \quad (3)$$

By deriving an output frame rate from the expression (3), the following expression (4) is obtained.

$$fo = 2/(-tofs + 1/f1 + tofsn + 1/f2) \quad (4)$$

Figure 9:
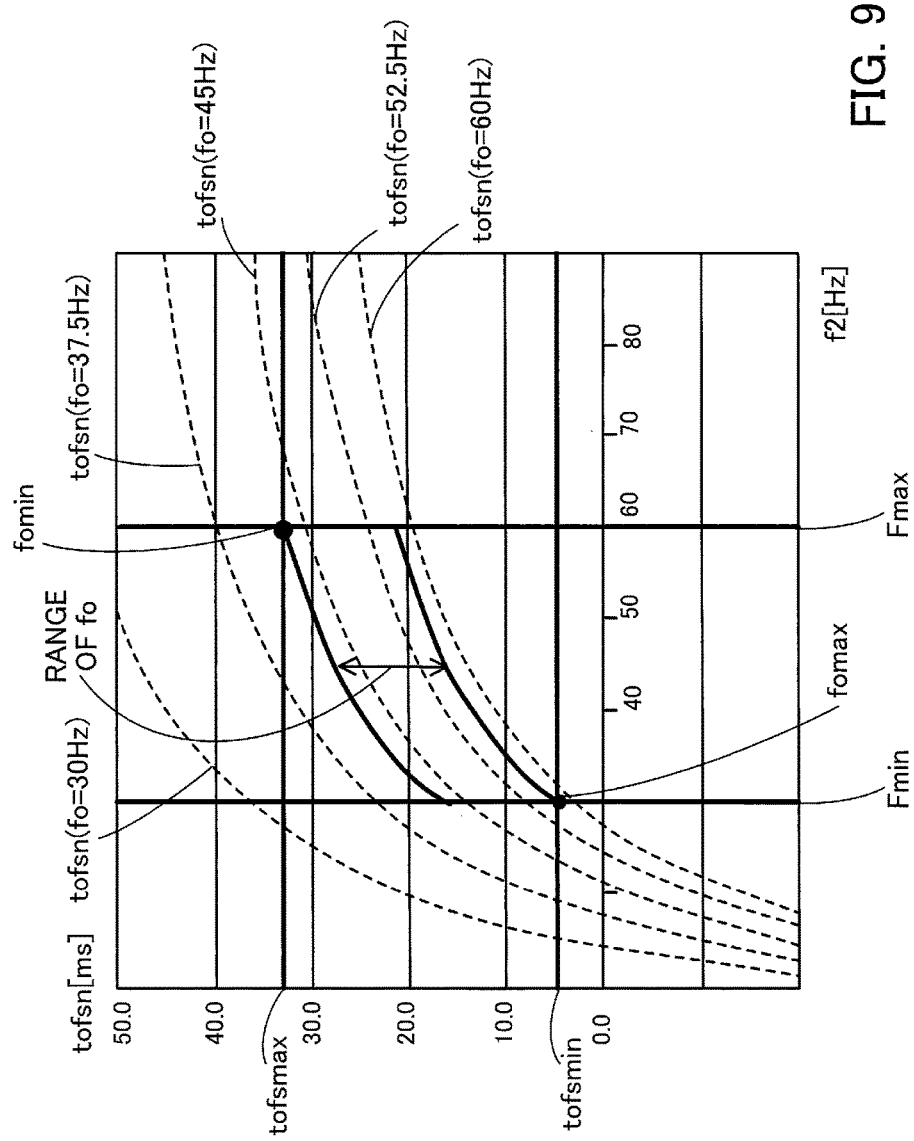
FIG. 9 illustrates a range of output frame rate that enables to avoid risks.

FIG. 9 illustrates a range of output frame rate that enables to avoid risks. FIG. 9 represents tofsn using the function of f2. The horizontal direction represents the frame rate [Hz] of f2, and the vertical direction represents time [ms] of tofsn. In this connection, in FIG. 9, it is assumed that the maximum frame rate Fmax is 60 Hz, the minimum frame rate Fmin is 30 Hz, the minimum delay time tofsmin is 5 ms, and the maximum delay time tofsmax is 33.3 ms.

Each dot line of FIG. 9 represents tofsn obtained by setting the output frame rate fo to a value in a range from the minimum frame rate (30 Hz) to the maximum frame rate (60 Hz). For example, A dot line of tofsn (fo=30 Hz) represents tofsn obtained by setting the output frame rate fo to 30 Hz. This applies to the others. In this way, the value of tofsn increases as the frame rate of f2 increases. In the case where the value of f2 is the same, the value of tofsn increases as the output frame rate fo decreases.

The minimum frame rate Fmin, the maximum frame rate Fmax, the minimum delay time tofsmin, and the maximum delay time tofsmax are defined values. Therefore, if the output frame rate fo that produces tofsn falling within a range defined by these limit values, it is possible to avoid the risks. That is, a timing inconsistency in which the read timing occurs before the write timing does not occur. Considering a range of fo such as to satisfy the limits, the minimum output frame rate fomin is an intersection of the maximum delay time tofsmax and the maximum frame rate Fmax of FIG. 9. On the other hand, the maximum output frame rate fomax is an intersection of the minimum delay time tofsmin and the minimum frame rate Fmin.

Therefore, by substituting the conditions (tofsn=tofsmax and f2=Fmax) for the minimum output frame rate fomin into the expression (4), the following expression (5) is obtained.

$$fomin = 2/(-tofs + 1/f1 + tofsmax + 1/Fmax) \quad (5)$$

Similarly, by substituting the conditions (tofsn=tofsmin and f2=Fmin) for the maximum output frame rate fomax into the expression (4), the following expression (6) is obtained.

$$fomax = 2/(-tofs + 1/f1 + tofsmin + 1/Fmin) \quad (6)$$

The computing unit 225 calculates the maximum output frame rate fomax and the minimum output frame rate fomin from the expressions (5) and (6), and compares these rates with the input frame rate used for writing to the first memory 2231. If the frame rate used for writing to the first memory 2231 falls within a range between the maximum output frame rate fomax and the minimum output frame rate fomin, the input frame rate of the first frame is set as the output frame rate. If the input frame rate used for writing to the first memory 2231 is higher than the maximum output frame rate fomax, the maximum output frame rate fomax is set as the output frame rate. If the frame rate of the first frame is lower than the minimum output frame rate fomin, the minimum output frame rate fomin is set as the output frame rate.

The following describes a frame rate control process with reference to flowcharts. The frame rate control is performed on an output signal to be output to the liquid crystal panel driving unit 123.

Figure 10:
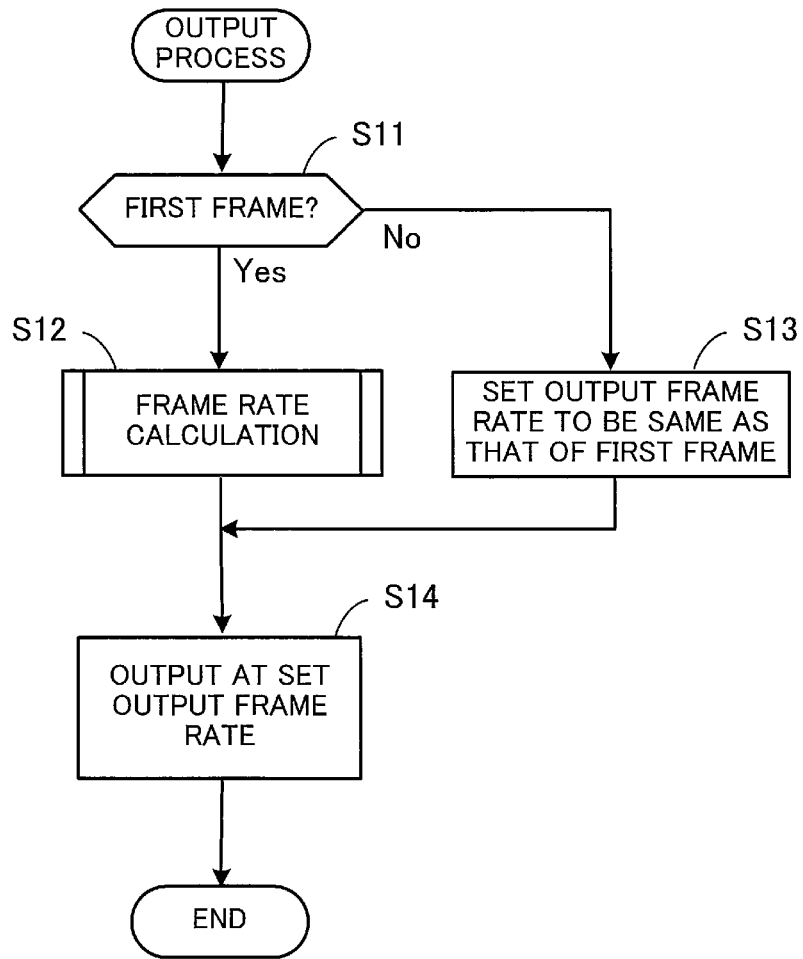
FIG. 10 is a flowchart illustrating how to perform an output process according to the second embodiment.

FIG. 10 is a flowchart illustrating how to perform an output process according to the second embodiment.

(Step S11) The computing unit 225 determines whether a frame whose frame rate is to be converted is a first frame or not. The process proceeds to step S12 if the frame is a first frame; otherwise, the process proceeds to step S13.

(Step S12) The computing unit 225 performs a frame rate calculation process to calculate an output frame rate for the first frame. For example, in the frame rate calculation process, the same frame rate as the input frame rate of the first frame may be set as the output frame rate for the first frame. Alternatively, the computing unit 225 may perform the frame rate calculation process on the basis of the defined values stored in the defined value storage unit 224. The frame rate calculation process using the defined values will be described in detail with reference to FIG. 11. After the frame rate calculation process is complete, the process proceeds to step S14.

(Step S13) The computing unit 225 sets the output frame rate of the second frame to be the same as the output frame rate of the first frame.

(Step S14) The output frame rate generation unit 227 generates a timing signal regarding the set output frame rate, and the output frame control unit 228 outputs frame data on the basis of the generated timing signal regarding the output frame rate.

With the above process, an output signal with the converted frame rate is output. The frame rate is converted such that a first frame and a second frame have an equal frame period. Thereby, a balance between the positive and negative polarities is obtained when the liquid crystal panel 130 is driven with the first frame of the first polarity and the second frame of the second polarity, which makes it possible to reduce the degradation of image quality due to superposition of a direct current component.

Figure 11:
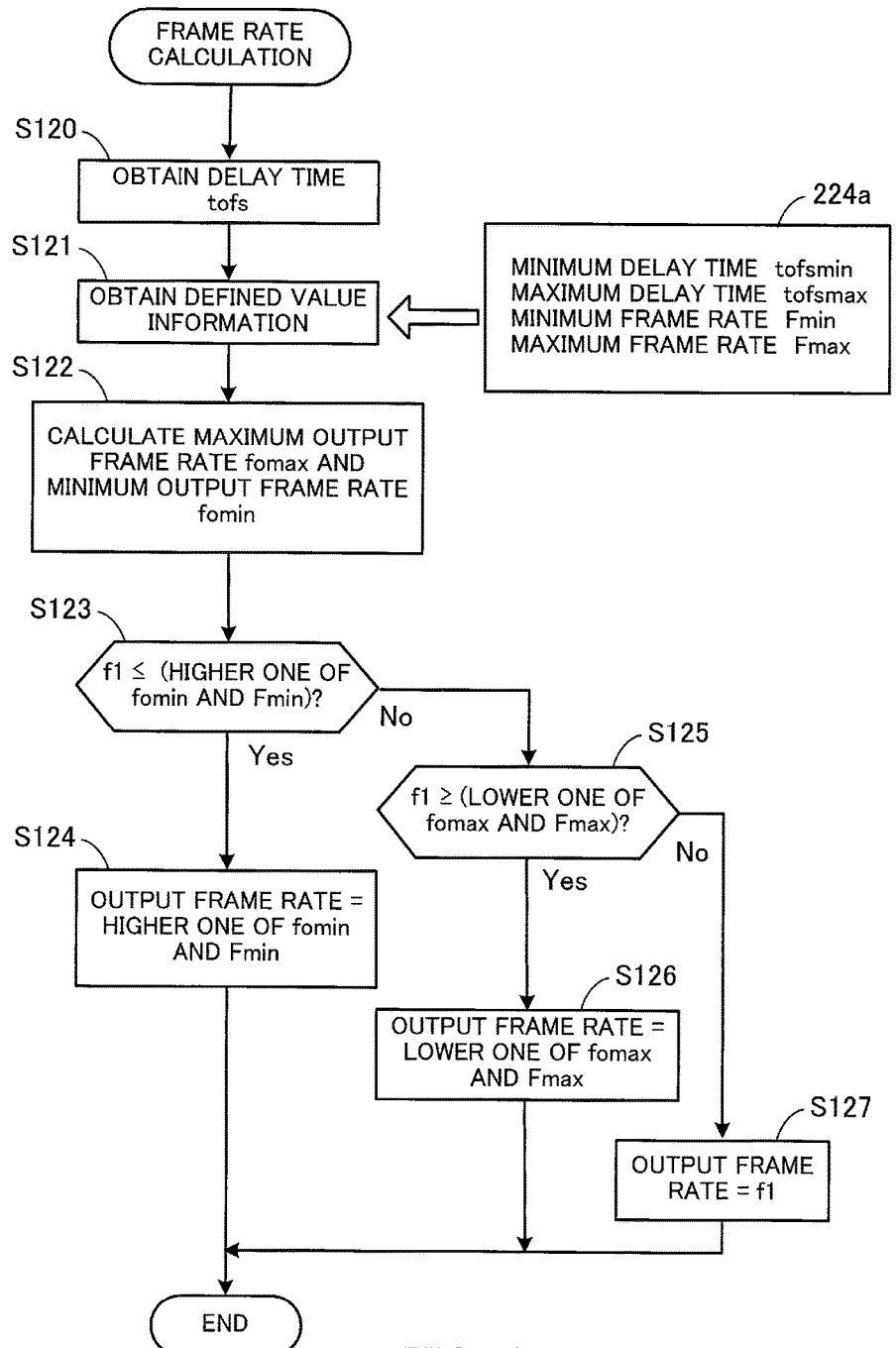
FIG. 11 is a flowchart illustrating how to perform a frame rate calculation process according to the second embodiment.

The following describes the frame rate calculation process. FIG. 11 is a flowchart illustrating how to perform a frame rate calculation process according to the second embodiment.

(Step S120) The computing unit 225 obtains a delay time tofs measured by the delay detection unit 222 with respect to a first frame.

(Step S121) The computing unit 225 reads defined values stored in the defined value storage unit 224. The defined value storage unit 224 stores therein defined values 224a including the minimum delay time tofsmin, the maximum delay time tofsmax, the minimum frame rate Fmin, and the maximum frame rate Fmax. The computing unit 225 reads these values.

(Step S122) The computing unit 225 calculates the maximum output frame rate fomax and the minimum output frame rate fomin using the read values and the expressions (5) and (6).

(Step S123) The computing unit 225 compares the minimum output frame rate fomin or the minimum frame rate Fmin, whichever is higher, with the input frame rate f1 of the first frame. If the input frame rate f1 is lower than or equal to the higher one of the minimum output frame rate fomin and the minimum frame rate Fmin, the process proceeds to step S124. If the input frame rate f1 is higher than the higher one of the minimum output frame rate fomin and the minimum frame rate Fmin, the process proceeds to step S125.

(Step S124) The computing unit 225 sets the higher one of the minimum output frame rate fomin and the minimum frame rate Fmin as the output frame rate fo1 for the first frame, and then the process is completed.

(Step S125) The computing unit 225 compares the maximum output frame rate fomax or the maximum frame rate Fmax, whichever is lower, with the input frame rate f1 of the first frame. If the input frame rate f1 is higher than or equal to the lower one of the maximum output frame rate fomax and the maximum frame rate Fmax, the process proceeds to step S126. If the input frame rate f1 is lower than the lower one of the maximum output frame rate fomax and the maximum frame rate Fmax, the process proceeds to step S127.

(Step S126) The computing unit 225 sets the lower one of the maximum output frame rate fomax and the maximum frame rate Fmax as the output frame rate fo1 for the first frame, and then the process is completed.

(Step S127) The computing unit 225 sets the input frame rate f1 of the first frame as the output frame rate for the first frame, and then the process is completed.

With the above procedure, an output frame rate which is able to avoid the risks of frame missing and frame repetition and is closer to the input frame rate of the first frame is calculated.

Figure 12:
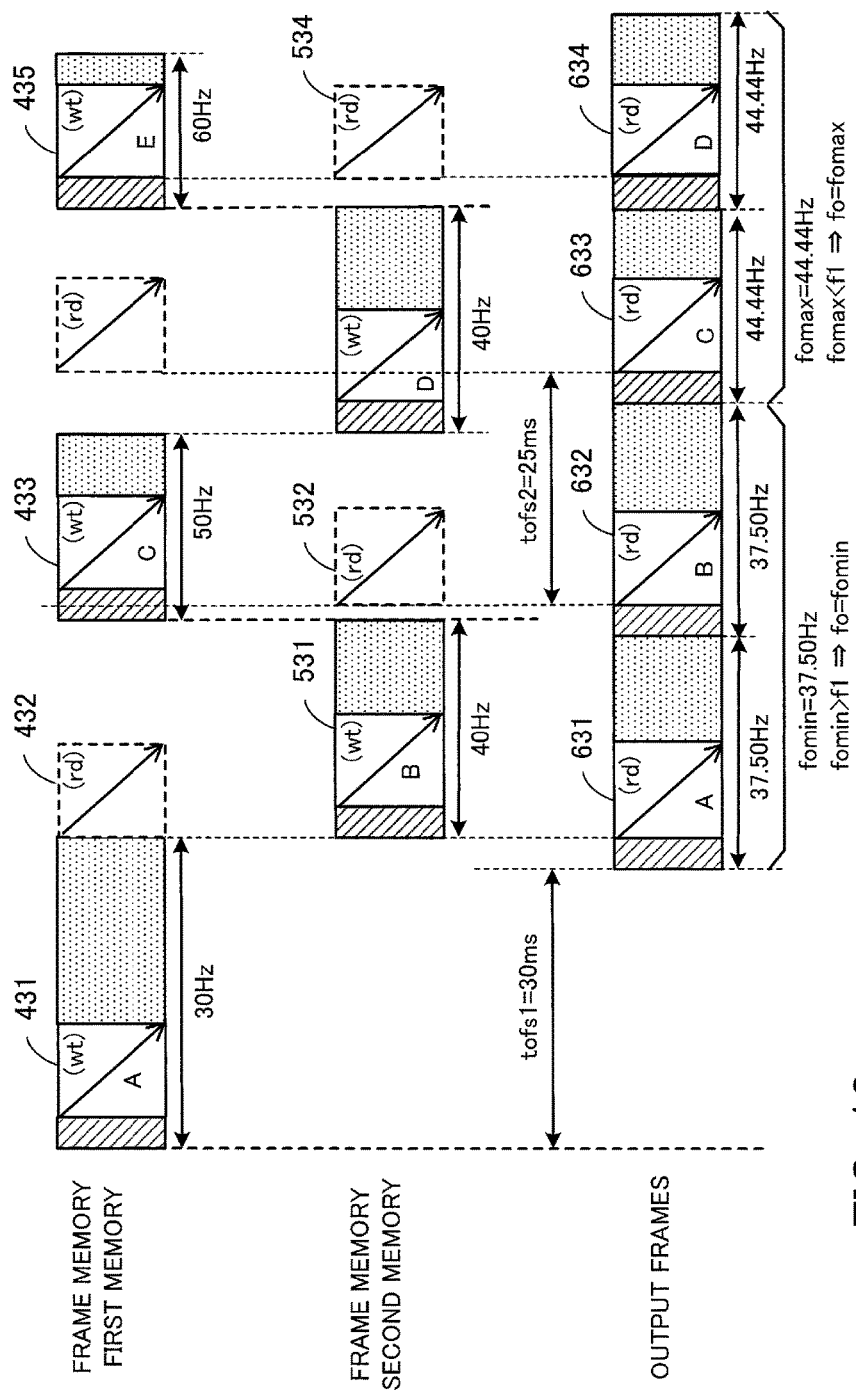
FIGS. 12 and 13 illustrate one example of frame rate control according to the second embodiment.
Figure 13:
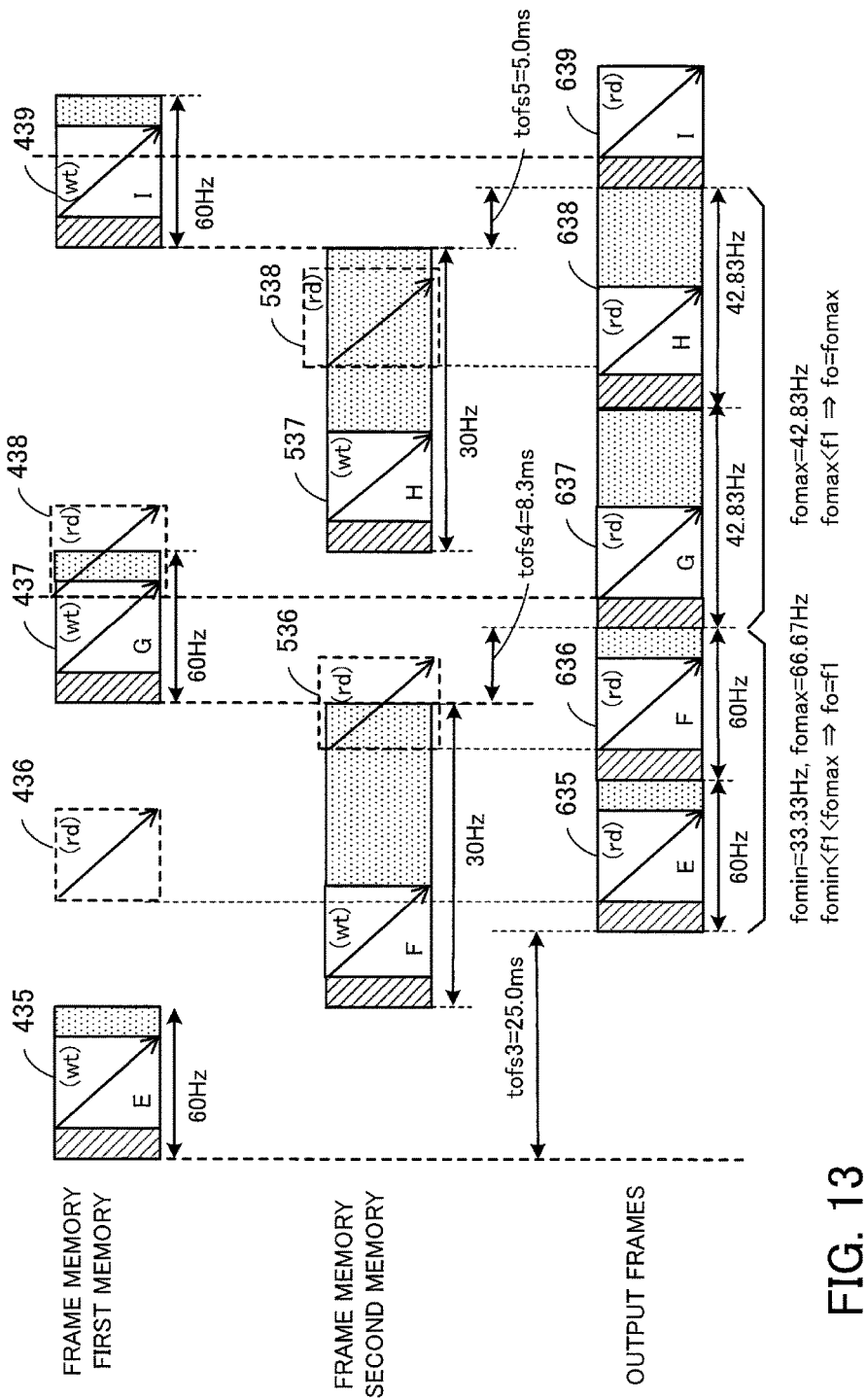

The following describes the above frame rate control process using a concrete example. FIGS. 12 and 13 illustrate one example of frame rate control according to the second embodiment. In the example of FIGS. 12 and 13, it is assumed that the defined value storage unit 224 stores therein the minimum frame rate Fmin of 30 Hz, the maximum frame rate Fmax of 60 Hz, the minimum delay time tofsmin of 5 ms, and the maximum delay time tofsmax of 33.3 ms. It is also assumed that a frame A (30 Hz), a frame B (40 Hz), a frame C (50 Hz), a frame D (40 Hz), a frame E (60 Hz), a frame F (30 Hz), a frame G (60 Hz), a frame H (30 Hz), and a frame I (60 Hz) are sequentially input to the liquid crystal driver 120. Values in parentheses indicate input frame rates. FIG. 12 illustrates the frame A to the frame E, whereas FIG. 13 illustrates the frame E to the frame I.

The input frame A is written in the first memory 2231 of the frame memory 223, and when a delay time tofs1 (30 ms) has passed, a read process 432 of the frame A is performed. A write process 531 of the next frame B to the second memory 2232 is performed after the write process 431 of the frame A to the first memory 2231 is complete. A read process 532 of the frame B written in the second memory 2232 is performed after an output frame A 631 is output.

Since the delay time tofs1 of 30 ms is measured with respect to the frame A, the minimum output frame rate fomin of 37.50 Hz is calculated by the computing unit 225 using the expression (5). Since the input frame rate f1 of the frame A is 30 Hz, fomin>f1 is obtained, and therefore the output frame rate fo is set to 37.5 Hz. By setting the output frame rate in this way, the order of the read process 532 of the frame B and the write process 433 of the frame C that becomes the first frame next does not cause a timing inconsistency.

Sequentially, the computing unit 225 performs the same frame rate control process, taking the frame C as the first frame and the frame D as the second frame. Since a delay time tofs2 of 25 ms is measured with respect to the frame C, the maximum output frame rate fomax of 44.44 Hz is calculated by the computing unit 225 using the expression (6). Since the input frame rate f1 of the frame C is 50 Hz, fomax<f1 is obtained, and therefore the output frame rate fo is set to 44.44 Hz. By setting the output frame rate in this way, the order of a read process 534 of the frame D and a write process 435 of the frame E that becomes the first frame next does not cause a timing inconsistency.

The processing for the next frame E and subsequent frames will be described with reference to FIG. 13. Since a delay time tofs3 of 25 ms is measured with respect to the frame E, the minimum output frame rate fomin of 33.33 Hz is calculated by the computing unit 225 using the expression (5), and the maximum output frame rate fomax of 66.67 Hz is calculated using the expression (6). Since the input frame rate f1 of the frame E is 60 Hz, fomin<f1<fomax is obtained, and therefore the output frame rate fo is set to 60 Hz. Similarly, since a delay time tofs4 of 8.3 ms is measured with respect to the frame G, the maximum output frame rate fomax of 42.83 Hz is calculated by the computing unit 225 using the expression (6). Since the input frame rate f1 of the frame G is 60 Hz, fomax<f1 is obtained, and therefore the output frame rate fo is set to 42.83 Hz.

As described above, the computing unit 225 calculates fomin and fomax using the expressions (5) and (6), and sets a range of output frame rate. Then, a frame rate that falls within the range and is the closest to the input frame rate f1 of the first frame is set as a common output frame rate for the first frame and the second frame. By doing so, when the inverse driving is performed for the first frame and the second frame, a balance between the first polarity and the second polarity in a driving cycle is obtained in the liquid crystal panel driving unit 123, which makes it possible to reduce the degradation of image quality, such as occurrence of image persistence due to superposition of a direct current component.

In addition, by appropriately limiting a range of output frame rate, it is possible to reduce the degradation of image quality, such as frame missing or frame repetition, due to a difference between the frame rate of an input frame and an output frame rate obtained through the frame rate conversion. Further, by setting a frame rate that falls within a range of output frame rate for reducing the degradation of image quality and is the closest to the input frame rate of the first frame, it is possible to display images as intended by a sender sending a video signal while reducing the above-mentioned degradation of image quality.

Third Embodiment

In the second embodiment, the liquid crystal panel driving unit 123 performs the inversion driving employing the one-frame inversion cycle. In the third embodiment, the inversion diving employing the two-frame inversion cycle. A frame rate control unit 122 of the third embodiment has the same configuration as that of the second embodiment illustrated in FIG. 5, and therefore the explanation thereof will be omitted.

Figure 14:
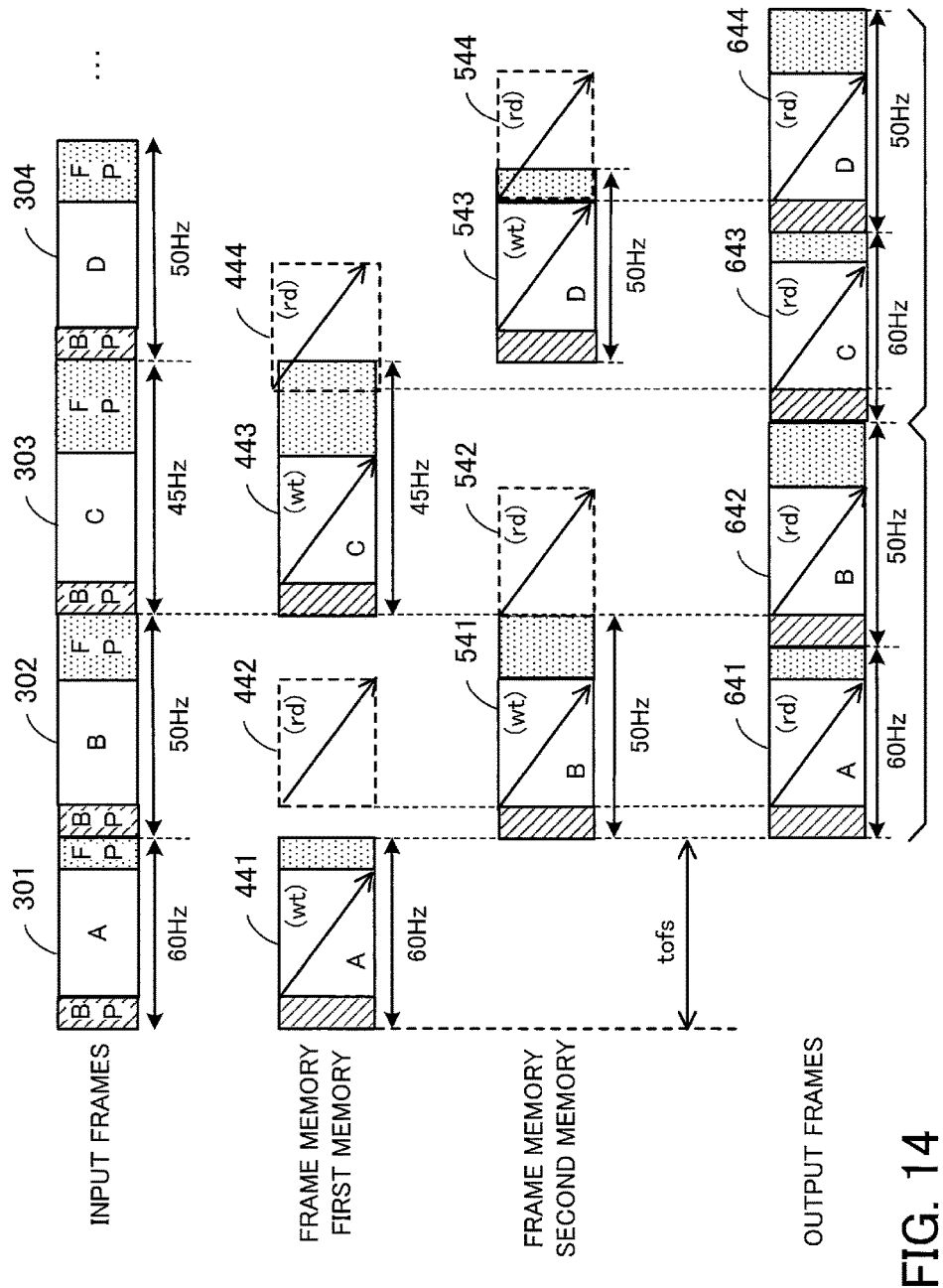
FIG. 14 illustrates an example of frame rate control according to a third embodiment.

FIG. 14 illustrates an example of frame rate control according to the third embodiment. The same reference numerals as FIG. 6 are applied to corresponding items. Since the inversion driving employing the two-frame inversion cycle is performed in the third embodiment, a liquid crystal panel driving unit 123 outputs continuous output frames A 641 and B 642 with the same first polarity. In addition, the liquid crystal panel driving unit 123 outputs continuous output frames C 643 and D 644 with the same second polarity.

Input frames of FIG. 14 are the same as those of the second embodiment illustrated in FIG. 6. Also, the input frames are written to a frame memory 223 in the same way. That is, a write process 441 of a frame A 301, which is input first to a first memory 2231 is performed, and then a write process 541 of a frame B 302, which is input next, to a second memory 2232 is performed. Similarly, a write process 443 of a frame C 303 to the first memory 2231, a write process 543 of a frame D 304 to the second memory 2232 are performed. These write processes are performed at input frame rates set for the respective frames.

On the other hand, the third embodiment reads frame data from the frame memory 223 and generates output frames in a different manner from the second embodiment. The third embodiment performs inversion driving employing the two-frame inversion cycle, and therefore the frame rate control is performed so that the total frame period of the output frame A 641 and the output frame B 642 and the total frame period of the output frame C 643 and the output frame D 644 are equal. The output frame A 641 is read from the first memory 2231 by a read process 422, and is output at the 60 Hz output frame rate, which is the same as the input frame rate. The output frame B 642 is read from the second memory 2232 by a read process 542, and is output at the 50 Hz output frame rate, which is the same as the input frame rate. The output frame C 643, which is a third frame, is read from the first memory 2231 by a read process 444, and is output at the 60 Hz output frame rate, which is the same as the output frame rate of the first frame. The output frame D 644, which is a fourth frame, is read from the second memory 2232 by a read process 544, and is output at the 50 Hz output frame rate, which is the same as the frame rate of the second frame.

As described above, the output frame A 641 and the output frame B 642 are output at the output frame rates that are the same as the input frame rates of their input frames. Then, the output frame C 643 is output at the same output frame rate as the output frame A 641, and the output frame D 644 is output at the same output frame rate as the output frame B 642. By doing so, the total frame period of the output frame A 641 and the output frame B 642, which are output with the first polarity, and the total frame period of the output frame C 643 and the output frame D 644, which are output with the opposite polarity, are equal. As a result, it is possible to reduce the degradation of image quality, such as image persistence due to superposition of a direct current component, in the case of employing the two-frame inversion cycle.

In the above frame rate control, the output frame rate of the output frame C 643 is set to be the same frame rate as the output frame A 641, and the output frame rate of the output frame D 644 is set to be the same frame rate as the output frame B 642. However, in the embodiment, the setting of these output frame rates is not limited to thereto. The assignment of frame periods to the output frame C 643 and the output frame D 644 may be desirably set as long as the total frame period of the output frames C 643 and D 644 and the total frame period of the output frames A 641 and B 642 are equal. For example, the input frame rate of the frame C 303 may be set as the output frame rate for the output frame C 643, and the total frame period may be adjusted using the output frame rate of the output frame D 644.

In addition, for example, assume that the input frame rates of the frame A 301, the frame B 302, the frame C 303, and the frame D 304 are taken as f1, f2, f3, and f4, respectively. The total frame period of the output frame C 643 and output frame D 644 is taken as 1/f1+1/f2, and the output frame rates for the output frames C 643 and D 644 are calculated such that 1/f1:1/f2=1/f3:1/4 is satisfied. In this case, the output frame rate fo3 for the output frame C 643 is calculated by the following expression (7).

$$fo3 = [(f1+f2)*f3 \cdot f4^2]/[f1 \cdot f2 \cdot (f3+f4)] \quad (7)$$

Similarly, the output frame rate fo4 for the output frame D 644 is calculated by the following expression (8).

$$fo4 = [(f1+f2)*f3^2 \cdot f4]/[f1 \cdot f2 \cdot (f3+f4)] \quad (8)$$

By doing so, compared with the case of using the same output frame rate for both the output frame A 641 and the output frame B 642, it is possible to set the output frame rates for the output frame C 643 and output frame D 644 to be closer to their input frame rates.

As described above, even in the case of performing the inversion driving employing the two-frame inversion cycle, it is possible to reduce the degradation of image quality due to the inversion driving. In this connection, the third embodiment describes the case of performing the inversion driving employing the two-frame inversion cycle. However, for example, output frame rates may be controlled in the same way for the case of performing inversion driving employing an inversion cycle of four frames or longer.

In addition, output frame rates may be controlled so as to reduce the occurrence of frame missing and frame repetition, in the same way as the second embodiment.

Fourth Embodiment

The second and third embodiments provide the frame memory 223 provided in the liquid crystal driver 120 with two planes as memory areas, i.e., the first memory 2231 and the second memory 2232. A fourth embodiment provides a frame memory having four planes as memory areas.

Figure 15:
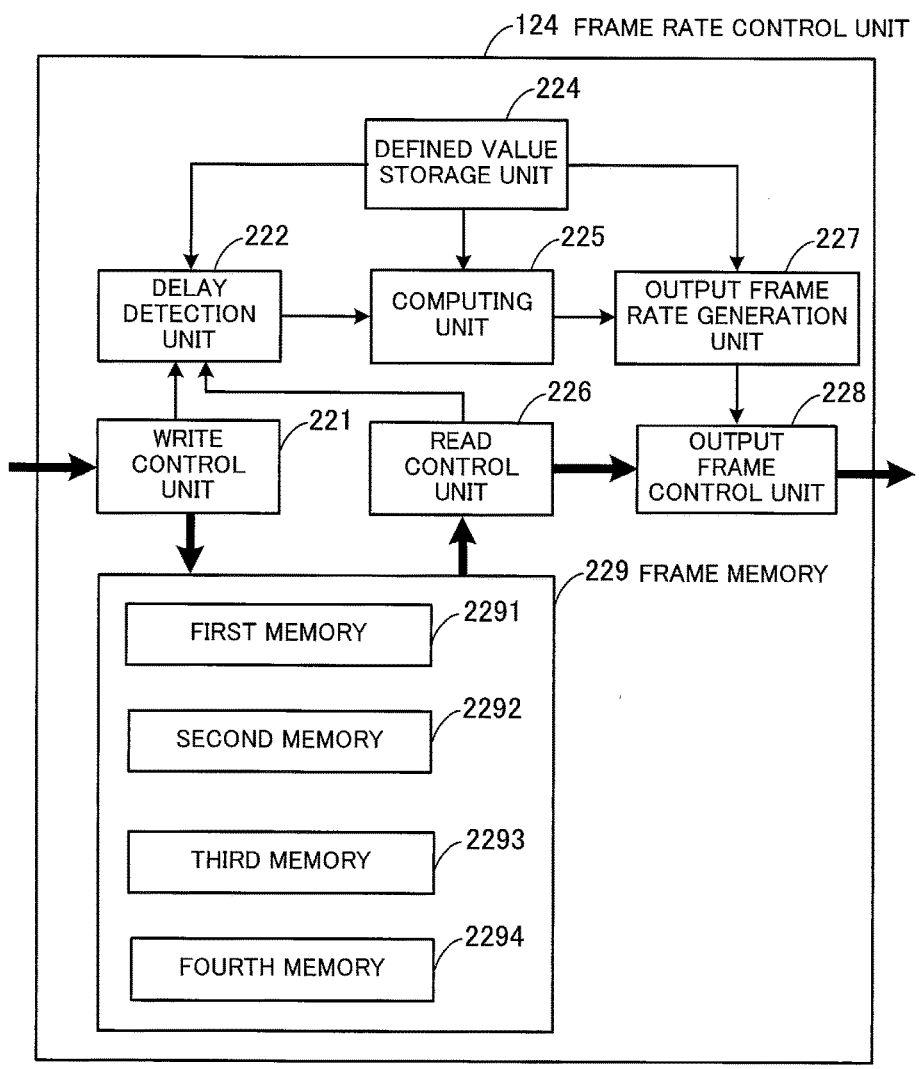
FIG. 15 is a functional block diagram illustrating a configuration of a frame rate control unit according to a fourth embodiment.

FIG. 15 is a functional block diagram illustrating a configuration of a frame rate control unit according to a fourth embodiment. The same reference numerals as FIG. 5 are applied to corresponding units. A frame rate control unit 124 of the fourth embodiment includes a write control unit 221, a delay detection unit 222, a defined value storage unit 224, a computing unit 225, a read control unit 226, an output frame rate generation unit 227, an output frame control unit 228, and a frame memory 229. The constituent components other than the frame memory 229 are the same as those of the frame rate control unit 122 of FIG. 5, and therefore the explanation thereof will be omitted.

The frame memory 229 temporarily stores input frames that are input via an input interface 121, on a frame-by-frame basis. The frame memory 229 has four planes as memory areas, each for storing the data part of one frame. In this embodiment, there are a first memory 2291, a second memory 2292, a third memory 2293, and a fourth memory 2294. The write control unit 221 writes the data part of an input frame in the four-plane frame memory 229 each time frame data is input. The memory is used in a cyclic manner as follows: The data of a frame that is input first is written in the first memory 2291, the data of a frame that is input second is written in the second memory 2292, the data of a frame that is input third is written in the third memory 2293, the data of a frame that is input fourth is written in the fourth memory 2294, and the data of a frame that is input next is written in the first memory 2291. The computing unit 225 calculates an output frame rate for frame data of every two planes, written in the frame memory 229. In the fourth embodiment, the average frame period of frames input to two planes is set as an output frame period. For example, it is assumed that the input frame rate of the first frame is taken as f1, the input frame rate of the second frame is taken as f2, the input frame rate of the third frame is taken as f3, and the input frame rate of the fourth frame is taken as f4. The computing unit 225 calculates an output frame rate $fo_{12}$ for the first and second frames using the following expression (9).

$$1/f1 + 1/f2 = 2/fo_{12} \quad (9)$$

Using this relationship, the output frame rate $fo_{12}$ is calculated by the following expression (10).

$$fo_{12} = 2 \cdot f1 \cdot f2/(f1+f2) \quad (10)$$

Similarly, an output frame rate $fo_{34}$ for the third and fourth frames is calculated by the following expression (11).

$$fo_{34} = 2 \cdot f3 \cdot f4/(f3+f4) \quad (11)$$

Figure 16:
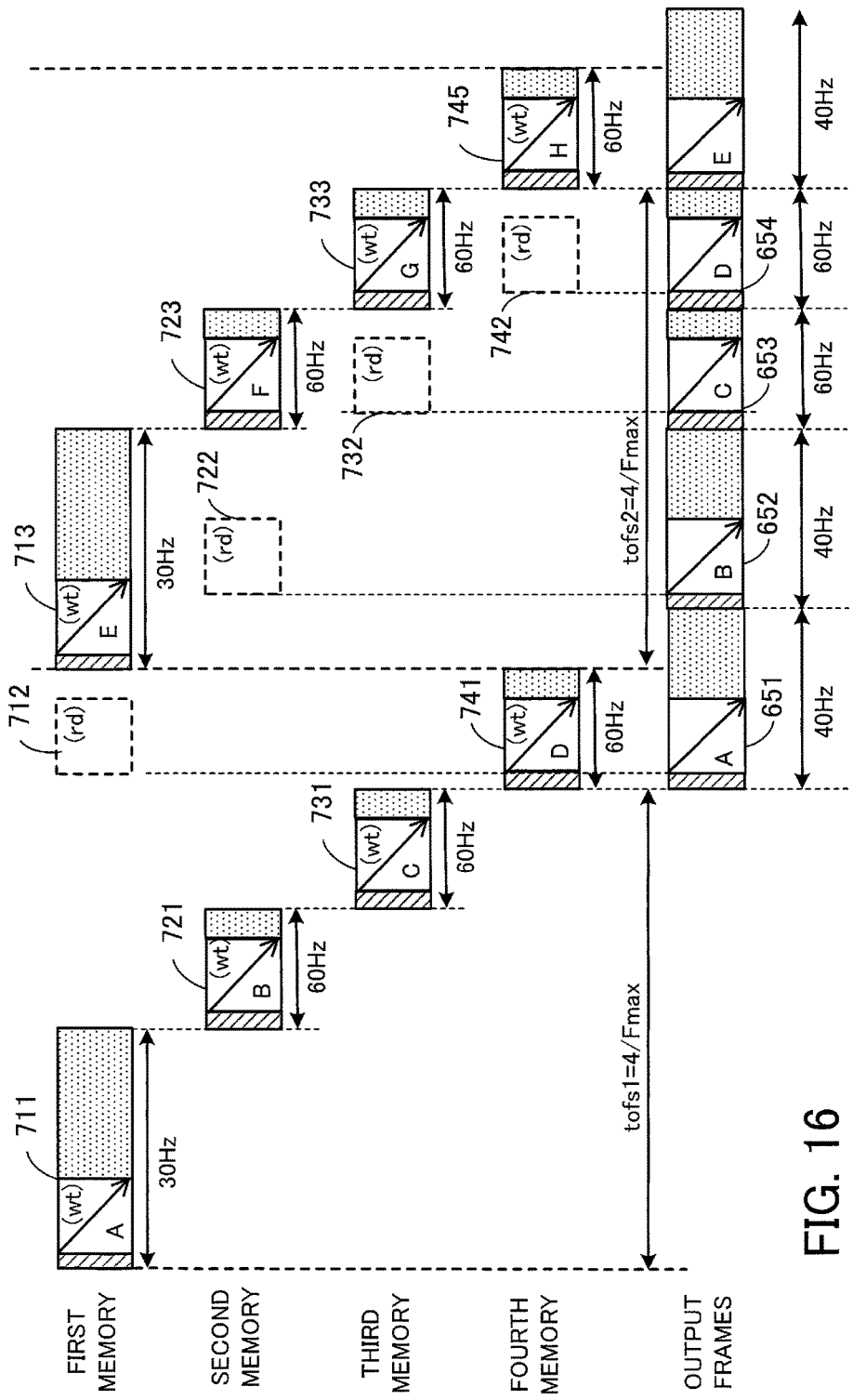
FIG. 16 illustrates an example of frame rate control according to the fourth embodiment.

In this connection, the following limits are provided to prevent frame missing and frame repetition. A range satisfying the following expression (12) is provided:

$$Fmax < 3Fmin, tofs = 4/Fmax \quad (12)$$

where Fmax denotes the maximum frame rate, Fmin denotes the minimum frame rate, and tofs denotes the delay time of a first frame. The operation of such frame rate control by the frame rate control unit 124 will now be described. FIG. 16 illustrates an example of frame rate control according to the fourth embodiment. In the example of FIG. 16, Fmax is set to 60 Hz and Fmin is set to 20 Hz.

Referring to the example of FIG. 16, a frame A (30 Hz), a frame B (60 Hz), a frame C (60 Hz), a frame D (60 Hz), a frame E (30 Hz), a frame F (60 Hz), a frame G (60 Hz), and a frame H (60 Hz) are input in this order to the write control unit 221. In synchronization with the inputs, the write control unit 221 performs a write process 711 of the frame A to the first memory 2291, a write process 721 of the frame B to the second memory 2292, a write process 731 of the frame C to the third memory 2293, and a write process 741 of the frame D to the fourth memory 2294. By the time a delay time tofs1 passes, the frame A and the frame B have been written in the frame memory 229. The computing unit 225 calculates an output frame rate from the detected input frame rates with the expression (10). In the example of FIG. 16, an output frame rate of 40 Hz is calculated. Then, an output frame A 651 and an output frame B 652 are output at the calculated output frame rate. Subsequently, the computing unit 225 calculates an output frame rate for the frame C, which is a third frame, and the frame D, which is a fourth frame, from their input frame rates with the expression (11). In the example of FIG. 16, an output frame rate of 60 Hz is calculated. Then, an output frame C 653 and an output frame D 654 are output at the calculated output frame rate.

With the above configuration, the delay time tofs of the first frame in the first round is fixed at 4/Fmax, and a timing inconsistency between writing and reading does not occur. Therefore, it is possible to reduce the degradation of image quality, such as frame missing or frame repetition, due to a difference between an input frame rate and an output frame rate.

As described above, compared with the case of providing two planes as memory areas, the case of providing four planes as memory areas makes it possible to prevent frame missing and frame repetition more easily. However, the frame memory 223 of this case needs to have a double capacity as much as that of the case of providing two planes as memory areas, and therefore it costs more. The number of planes as memory areas in the frame memory is set appropriately according to necessity. In this connection, in the case of providing four or more planes as memory areas in a frame memory, frame rates may be controlled by the same approach as the case of providing four planes as memory areas.

The above processing functions may be implemented by a computer. In this case, a program describing the processing content of the functions implemented by the display apparatus is provided. The processing functions are implemented by causing the computer to run the program. The program describing the processing content may be recorded on a computer-readable recording medium. Computer-readable recording media include magnetic storage devices, optical discs, magneto-optical recording media, semiconductor memories, and others. Magnetic storage devices include hard disk drives (HDD), flexible disks (FD), magnetic tapes, and others. Optical discs include Digital Versatile Discs (DVD), DVD-RAMs (Random Access Memories), Compact Disc-Read Only Memories (CD-ROM), CD-Rs (Recordable), CD-RWs (rewritable), and others. Magneto-optical recording media include Magneto-optical disks (MO) and others.

For example, to distribute the program, portable recording media, such as DVDs and CD-ROMs, on which the program is recorded may be put on sale. Alternatively, the program may be stored in a storage device of a server computer, and may be transferred from the server computer to other computers over a network.

A computer that runs the program may store the program recorded in a portable recording medium or the program received from the server computer in a local storage device. Then, the computer reads the program from the local storage device, and performs processes according to the program. In this connection, the computer may read the program directly from the portable recording medium, and then perform processes according to the program. Alternatively, the computer may perform processes according to the program while receiving the program from the server computer over a network.

In addition, at least part of the above processing functions may be implemented by using a Digital Signal Processor (DSP), Application Specific Integrated Circuit (ASIC), Programmable Logic Device (PLD), or other electronic circuits.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A display apparatus comprising:
a conversion unit configured to:
receive an input signal including frames to which input frame rates are respectively set;
individually set the received frames as a first frame to be output with a first polarity or a second frame to be output with a second polarity opposite to the first polarity; and
convert the input frame rates to output frame rates of the first frames and output frame rates of the second frames so that a first frame period taken to output the first frames and a second frame period taken to output the second frames are equal within a predetermined time period; and
an output unit configured to:
output the first frames with the first polarity to a display unit, and
output the second frames with the second polarity to the display unit,
wherein the conversion unit includes a frame memory including a plurality of memory areas each for storing one of the frames,
wherein the conversion unit detects a delay time of one frame of the received frames from a start of writing of the one frame to a prescribed memory area of the plurality of memory areas to a start of reading of the one frame from the prescribed memory area, the delay time being a shortest time period taken until one round of sequentially using the plurality of memory areas to write therein the frames ends and then writing to the prescribed memory area starts in a next round,
wherein the plurality of memory areas include a first memory area for storing the first frame and a second memory area for storing the second frame that is input following the first frame, and
wherein the conversion unit:
calculates a maximum output frame rate and a minimum output frame rate for output frames, based on an input frame rate and the delay time that are detected with respect to the first frame, and a maximum frame rate and a minimum frame rate of the input signal,
compares the maximum output frame rate and the minimum output frame rate with the input frame rate of the first frame,
sets the maximum output frame rate as an output frame rate if the input frame rate of the first frame is higher than the maximum output frame rate, sets the minimum output frame rate as the output frame rate if the input frame rate of the first frame is lower than the minimum output frame rate, and sets the input frame rate of the first frame as the output frame rate if the input frame rate of the first frame is between the maximum output frame rate and the minimum output frame rate.

2. The display apparatus according to claim 1, wherein the conversion unit sets continuously received frames of the input signal alternately as first frames forming a first frame group or second frames forming a second frame group, associates the first frames of the first frame group, respectively, with the second frames of the second frame group, and sets a same frame rate for first and second frames associated with each other, the first frame group and the second frame group being based on an inversion cycle at which the first polarity and the second polarity are inverted in the display unit.

3. The display apparatus according to claim 1, wherein the conversion unit receives the input signal in which a maximum value and a minimum value of the input frame rates satisfy a prescribed relationship, the prescribed relationship being determined based on a number of memory areas.

4. The display apparatus according to claim 1, wherein the conversion unit calculates the maximum output frame rate fomax using $$fomax=2/(-tofs+1/f1+tofsmin+1/Fmin),$$

and the minimum output frame rate fomin using $$fomin=2/(-tofs+1/f1+tofsmax+1/Fmax),$$

where f1 denotes the input frame rate of the first frame, tofs denotes a delay time, tofsmax denotes a maximum delay time for the delay time, tofsmin denotes a minimum delay time for the delay time, Fmax denotes the maximum frame rate of the input signal, and Fmin denotes the minimum frame rate of the input signal.

5. A display apparatus comprising:
a conversion unit configured to:
receive an input signal including frames to which input frame rates are respectively set;
individually set the received frames as a first frame to be output with a first polarity or a second frame to be output with a second polarity opposite to the first polarity; and
convert the input frame rates to output frame rates of the first frames and output frame rates of the second frames so that a first frame period taken to output the first frames and a second frame period taken to output the second frames are equal within a predetermined time period; and
an output unit configured to:
output the first frames with the first polarity to a display unit; and
output the second frames with the second polarity to the display unit,
wherein the conversion unit includes a frame memory including
a first memory area for storing the first frame,
a second memory area for storing the second frame that is input following the first frame,
a third memory area for storing a third frame that is input following the second frame and is to be output with the first polarity, and
a fourth memory area for storing a fourth frame that is input following the third frame and is to be output with the second polarity, and
wherein the conversion unit
sets an average input frame rate of the first frame and the second frame as an output frame rate for the first frame and the second frame, and
sets an average input frame rate of the third frame and the fourth frame as an output frame rate for the third frame and the fourth frame.

6. The display apparatus according to claim 5, wherein the conversion unit sets limits on the input signal, the limits being that a maximum frame rate of the input frames of the input signal is less than or equal to three times a minimum frame rate of the input frames and that a delay time from start of writing of a frame to a prescribed one of the plurality of memory areas to start of reading of the frame from the prescribed memory area is equal to four times a frame period corresponding to the maximum frame rate.

7. A display method executed by a display apparatus, the display method comprising:
receiving an input signal including frames to which input frame rates are respectively set;
individually setting the received frames as a first frame to be output with a first polarity or a second frame to be output with a second polarity opposite to the first polarity;
converting the input frame rates to output frame rates of the first frames and output frame rates of the second frames so that a first frame period taken to output the first frames and a second frame period taken to output the second frames are equal within a predetermined time period;
outputting the first frames with the first polarity to a display unit;
outputting the second frames with the second polarity to the display unit;
storing the first frame to a first memory area;
storing the second frame that is input following the first frame to a second memory area;
storing a third frame that is input following the second frame and is to be output with the first polarity to a third memory area;
storing a fourth memory that is input following the third frame and is to be output with the second polarity to a fourth memory area;
setting an average input frame rate of the first frame and the second frame as an output frame rate for the first frame and the second frame; and
setting an average input frame rate of the third frame and the fourth frame as an output frame rate for the third frame and the fourth frame.

* * * * *